US012672226B2

(12) United States Patent     (10) Patent No.:   US 12,672,226 B2

Douglas et al.     (45) Date of Patent:   *Jun. 30, 2026

(54) LIGHT SOURCE SYSTEM AND METHOD OF OPERATION

(71) Applicant: xLight Inc., Palo Alto, CA (US)

(72) Inventors: David Douglas, Palo Alto, CA (US); Robert Legg, Palo Alto, CA (US); Christopher Mayes, Palo Alto, CA (US); Bruce Dunham, Palo Alto, CA (US); Joseph Conway, Palo Alto, CA (US); George Randall Neil, Palo Alto, CA (US); Christopher Pierce, Palo Alto, CA (US); Colwyn Gulliford, Palo Alto, CA (US)

(73) Assignee: xLight Inc., Palo Alto, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 18/794,414

(22) Filed: Aug. 5, 2024

(65) Prior Publication Data

US 2025/0056704 A1     Feb. 13, 2025

Related U.S. Application Data

(60) Provisional application No. 63/531,967, filed on Aug. 10, 2023.

(51) Int. Cl.
| | |
|---|---|
| *H05G 2/00* | (2006.01) |
| *H01S 3/09* | (2006.01) |
| *H05H 7/04* | (2006.01) |

(52) U.S. Cl.
CPC ........... *H05G 2/007* (2024.08); *H01S 3/0903* (2013.01); *H05G 2/0084* (2024.08); *H05G*

2/0086 (2024.08); *H05H 7/04* (2013.01); *H05H 2007/045* (2013.01)

(58) Field of Classification Search
None
See application file for complete search history.

(56) References Cited

U.S. PATENT DOCUMENTS

| | | | |
|---|---|---|---|
| 9,392,679 | B2 | 7/2016 | Hosler |
| 9,541,839 | B2 | 1/2017 | Hosler |
| 9,823,572 | B2 | 11/2017 | Nikipelov et al. |
| 9,844,124 | B2 | 12/2017 | Hosler et al. |

(Continued)

FOREIGN PATENT DOCUMENTS

| | | |
|---|---|---|
| JP | 2017050347 A | 3/2017 |

OTHER PUBLICATIONS

Citron, A. , et al., "The Karlsruhe—Cern Superconducting RF Separator", Nuclear Instruments and Methods 164 (1979) 31-55.

(Continued)

*Primary Examiner* — Hoon K Song

(74) *Attorney, Agent, or Firm* — Jeffrey Schox; Samuel Rosenthal

(57)     ABSTRACT

A light source system, preferably including one or more electron inputs, splitters, recombiners, and/or electron outputs, and optionally including one or more accelerator modules, input transports, radiator modules, and/or output transports. The system can optionally include one or more ancillary elements (e.g., electron optics elements). A method of operation, preferably including operating in a normal mode and/or operating in a backup mode.

20 Claims, 12 Drawing Sheets

(56) References Cited

U.S. PATENT DOCUMENTS

| | | | |
|---|---|---|---|
| 10,437,154 B2 | 10/2019 | Nikipelov et al. | |
| 10,627,724 B2 | 4/2020 | Everts et al. | |
| 10,884,339 B2 | 1/2021 | Engelen et al. | |
| 12,022,599 B2 | 6/2024 | Hosler et al. | |
| 2014/0270086 A1 | 9/2014 | Krasnykh | |
| 2016/0301180 A1 | 10/2016 | Nikipelov et al. | |
| 2017/0003597 A1 | 1/2017 | Patra | |
| 2017/0019982 A1 | 1/2017 | Hosler et al. | |
| 2020/0295522 A1* | 9/2020 | Whitney | B64G 3/00 |
| 2023/0226378 A1* | 7/2023 | Bourhis | A61N 5/1042 |
| | | | 250/505.1 |
| 2024/0121876 A1* | 4/2024 | Hosler | H01S 3/0903 |

OTHER PUBLICATIONS

Hosler, Erik Robert, et al., "Redundant Light Source System and Method of Operation", U.S. Appl. No. 18/482,308, filed Oct. 6, 2023.

Hosoyama, K. , et al., "Construction and Commisioning of KEKB Superconducting Crab Cavities", Proceedings of SRF2007, Peking Univ., Beijing, China, Sep. 2003, MO4: Progress Reports IV.

Kazimi, Reza , et al., "Four Beam Generation for Simultaneous Four-Hall Operation at Cebaf", Proceedings, 7th International Particle Accelerator Conference (IPAC 2016) : Busan, Korea, May 8-13, 2016.

Leemann, Christoph W., et al., "The Continuous Electron Beam Accelerator Facility: Cebaf at the Jefferson Laboratory", Annu. Rev. Nucl. Part. Sci. 2001. 51:413-50.

Preger, M. , "Dafne Main Rings", http://www.lnf.infn.it/acceleratori/dafne/main.html, Jun. 29, 1998.

Storey, Douglas W., et al., "Beam Dynamics Driven Requirements on the Ariel E-Linac SRF Separator Cavity", Proceedings of PAC2013, Pasadena, CA USA, Sep.-Oct. 2013, paper THPBA01, pp. 1223-1225.

Storey, Douglas W., et al., "Fabrication Studies of a 650 MHZ Superconducting RF Deflecting Mode Cavity for the Ariel Electron Linac", Proceedings of IPAC2017, Copenhagen, Denmark, MOPAB022, 07 Accelerator Technology, T07 Superconducting RF, May 2017, pp. 120-122.

Tiefenback, M.G. , et al., "Compensation of RF-Induced Energy Spread in the CEBAF Injector Chopping System", IEEE, Washington, DC, USA, May 17-20, 1993.

York, R. C. , et al., "Optics of the Cebaf CW Superconducting Accelerator", 12th IEEE Particle Accelerator Conference, Washington, DC, USA, Mar. 16-19, 1987, pp. 1292.

Black, et al., "Light Source System and Method of Operation", Co-pending U.S. Appl. No. 19/320,258, filed Sep. 5, 2025.

Chen, et al., "Design of the Beam Distribution System and Shine", 67th ICFA Adv. Beam Dyn. Workshop Future Light Sources, FLS2023, Luzern, Switzerland, JACoW Publishing, ISBN: 978-3-95450-224-0 ISSN: 2673-7035, doi: 10.18429/JACoW-FLS2023-TU4P0, Feb. 3, 2024.

Hara, et al., "Pulse-by-pulse multi-beam-line operation for x-ray free-electron lasers", Physical Review Accelerators and Beams 19, 020703 (2016).

Paraliev, et al., "Development of High Stability Resonant Kicker for Swiss Free Electron Laser", 2013 Abstracts IEEE International Conference on Plasma Science (ICOPS), Jun. 16-21, 2013, San Francisco, CA, USA, 10.1109/PLASMA.2013.6634964.

* cited by examiner input
transports bending
magnets bending
magnets output
transports 162b 162a 121a 121b 122a 122b 161b   161a

160

120 radiator
modules input
transports bending
magnets bending
magnets output
transports 162b 162a phase
match/
ΦSE
(BBU)

121a

121b phase
match

122a

122b achromatic
transport
$R_{56} \sim 0$ phase
match
(& ΦSE)

phase
match
(& ΦSE)

achromatic
transport
$R_{56} \sim 0$ 161b   161a

160 radiator
modules input
transports radiator
modules output
transports

121

162 deflector
(active)          122

161          deflector
(active)

bending
magnets bending
magnets undulator radiator module 140 dipole
magnet light
output long
axis electron
beam

S410

LEGEND

●    electron bunch from first accelerator module

○    electron bunch from second accelerator module

—    kicker field

400

LIGHT SOURCE SYSTEM AND METHOD OF OPERATION

CROSS-REFERENCE TO RELATED APPLICATIONS

This application claims the benefit of U.S. Provisional Application Ser. No. 63/531,967, filed on 10 Aug. 2023, which is incorporated in its entirety by this reference.

TECHNICAL FIELD

This invention relates generally to the light source field, and more specifically to a new and useful light source system and method of operation.

DESCRIPTION OF THE PREFERRED EMBODIMENTS

Figure 1A:
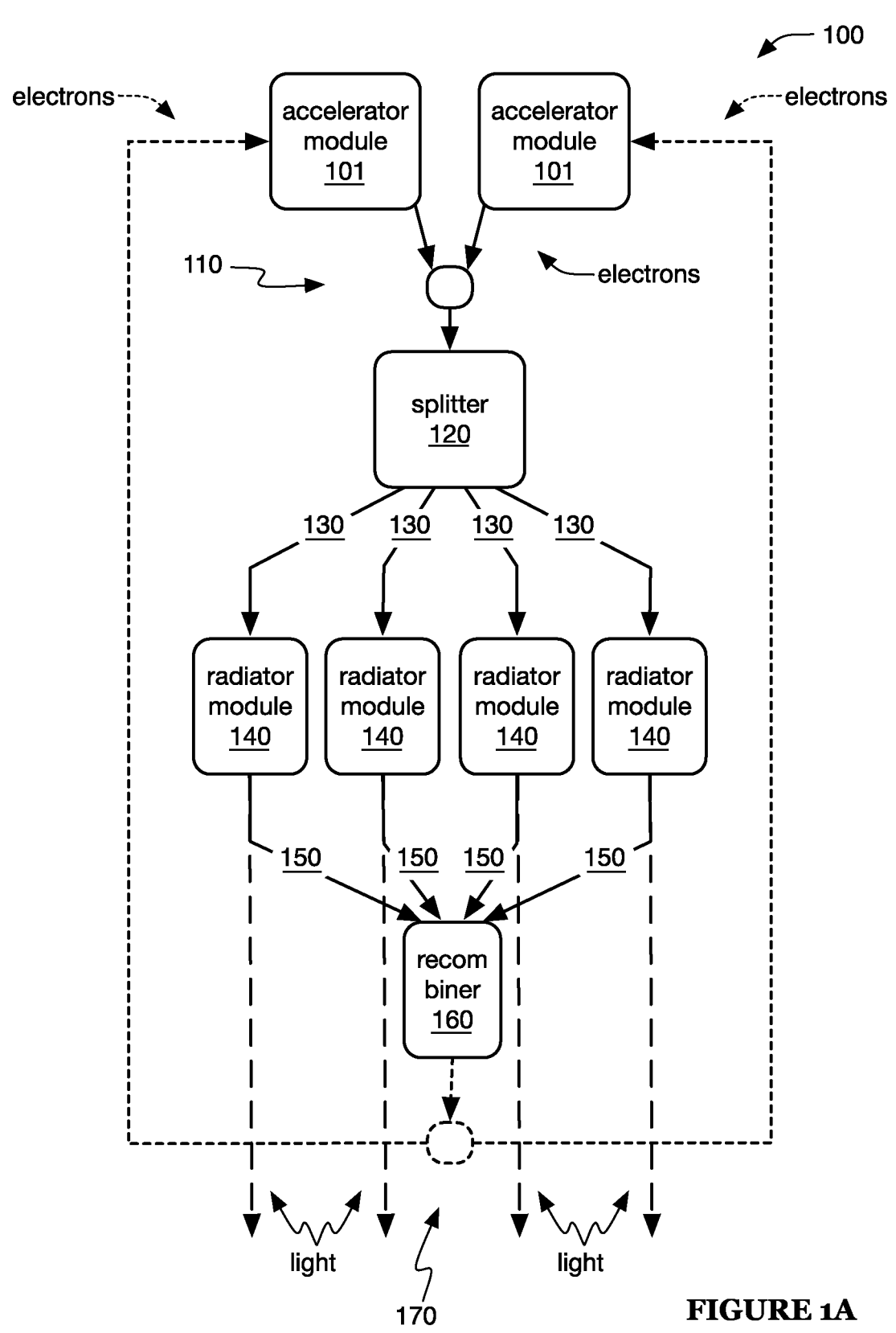
FIGS. 1A-1C are schematic representations of a first, second, and third variation, respectively, of a light source system.

The following description of the preferred embodiments of the invention is not intended to limit the invention to these preferred embodiments, but rather to enable any person skilled in the art to make and use this invention.

1. Overview

A light source system 100 preferably includes one or more electron inputs 110, splitters 120, recombiners 160, and/or electron outputs 170, and preferably includes one or more accelerator modules 101, input transports 130, radiator modules 140, and/or output transports 150 (e.g., as shown in FIGS. 1A-1C, 2A-2D, and/or 3A-3B). The system 100 can optionally include one or more ancillary elements (e.g., electron optics elements) and/or can additionally or alternatively include any other suitable elements in any suitable arrangement.

Figure 7:
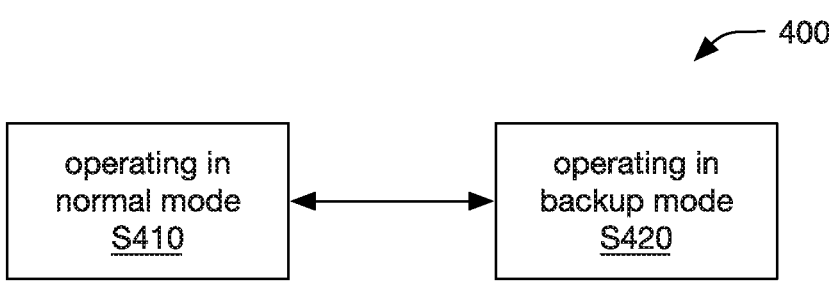
FIG. 7 is a flowchart representation of a method of operation.

A method of operation 400 preferably includes operating in a normal mode S410 and/or operating in a backup mode S420 (e.g., as shown in FIG. 7). However, the method 400 can additionally or alternatively include any other suitable elements performed in any suitable manner.

The system 100 preferably defines a plurality of electron beam paths (e.g., each passing through a different radiator module of the system). The path length differences between different electron beam paths (e.g., between all paths taken by electron bunches from a single accelerator module, which may include all paths, such as in some examples of operating in a backup mode) are preferably equal (or substantially equal) to an integer multiple of the electron travel distance defined by the accelerator frequency (e.g., the electron velocity divided by the accelerator frequency). In one example, in which the accelerator frequency f is 750 MHz and the electron velocity is approximately equal to the speed of light c, the corresponding electron travel distance is approximately equal to $c/f=40$ cm, and so the path length differences are preferably equal to an integer multiple of 40 cm. In a second example, some or all of the paths are configured to have the same path length (or substantially the same path length, such as within a threshold difference that is less than a typical variation in electron bunch timing exhibited by the accelerator modules). In some embodiments, some or all of the electron beam paths can optionally include one or more elements arranged along them that are operable to adjust the path length (and/or the electron energy), which can function to enable tuning of this path length difference (e.g., in response to operational changes, such as switching from a normal mode to a backup mode).

A person of skill in the art will recognize that the electron beam paths defined by the system can have any suitable arrangements (e.g., coplanar beam paths, beam paths defined on different planes, beam paths not confined to a single plane, etc.). Beam transport along these paths preferably provides substantially equivalent focusing and/or bending to all beams, thereby enabling retention of desirable features of phase-based manipulations (e.g., use of identical transverse and/or longitudinal matches in all lines). Additionally or alternatively, any or all beam paths can be configured using any one or more of a variety of different septum configurations, which can allow bending one or more beams in and/or orthogonal to the plane of separation (and/or along any other suitable directions) by angles that may differ (e.g., ranging from zero to full bends) and/or include bends in the same and/or opposite directions. Additionally or alternatively, the transport can provide mitigation of any interferences between electron transport and optical transport hardware (and/or any other suitable mitigation). Further, a person of skill in the art will recognize that bunch length compression and/or decompression can be arranged within the split-beam region of the system (e.g., with the use of compressive transport) and/or outside of the split-beam region (e.g., with the use of isochronous distribution transport).

The light source system 100 and/or method of operation 400 preferably function to provide a plurality of light outputs, and/or to provide redundancy in case of failure, shutdown, and/or other anomalous conditions associated with one or more elements of the system (e.g., one or more accelerator modules 101). The light is preferably output as multiple beams (e.g., spatially-separated light beams, preferably wherein each beam is collimated or substantially collimated), such as wherein different beams can be directed toward endpoints. The light output is preferably polarized or substantially polarized (e.g., to facilitate use with semiconductor fab photolithography equipment, such as steppers and/or scanners), but can alternatively be unpolarized, partially polarized, or have any other suitable polarization; in some embodiments, some or all light beams can have different polarizations as compared with each other. The light output is preferably coherent or substantially coherent, but can alternatively be incoherent or have any other suitable coherency. However, the light output by the system 100 can additionally or alternatively have any other suitable characteristics. In some embodiments, the light source system can define a free-electron laser (FEL) or a plurality of FELs (e.g., wherein each FEL of the output is configured to output a separate beam of light), such as wherein the light preferably has spatial and/or temporal characteristics suitable and/or desirable for lithography applications, such as EUV lithography applications.

The light output preferably has high photon energy, such as being EUV light (e.g., 13.5 nm, 6.7 nm, etc.), X-ray light, and/or any other suitable high-energy light, but can additionally or alternatively have any other suitable photon energy. In examples, the light output can be X-ray light (e.g., 5 nm, 1 nm, 0.1 nm, 0.01-0.1 nm, 0.1-0.2 nm, 0.2-0.5 nm, 0.5-1 nm, 1-2 nm, 2-5 nm, etc.), UV light, preferably EUV light (e.g., 13.5 nm, 6.7 nm, 5-8 nm, 8-15 nm, 15-30 nm, 30-121 nm, etc.) but additionally or alternatively any other suitable UV light (e.g., 100-280 nm, 280-315 nm, 315-400 nm, etc.), and/or any other suitable high-energy light, but can additionally or alternatively have any other suitable photon energy (e.g., visible light such as light having a wavelength in the 400-750 nm range, infrared light such as light having a wavelength in the 0.75-15 μm range and/or the 15-1000 μm range, millimeter-wave radiation such as light having a wavelength in the 1-10 mm range, etc.); a person of skill in the art will recognize that, although the wavelength of light may vary depending on the medium through which it propagates, the wavelengths described herein typically refer to the photon wavelength in a vacuum (the 'free-space photon wavelength'). The light output is preferably substantially monochromatic (e.g., having a bandwidth less than 1, 0.5, 0.3, 0.2, 0.1 nm, or less, less than 10%, 5%, 2%, 1%, or less of the nominal or central wavelength, etc.), but can alternatively have any other suitable bandwidth.

In some embodiments, the light source system 100 (and/or any elements thereof, including, without limitation, one or more radiator modules 140, accelerator modules 101, and/or crossover modules 110) and/or method 400 (and/or any elements thereof, including, without limitation, operating in the normal mode S410 and/or operating in the backup mode S420) can include one or more elements (and/or any suitable aspects thereof) such as described in U.S. patent application Ser. No. 14/803,068, filed 18 Jul. 2015 and titled "METHOD, APPARATUS AND SYSTEM FOR PROVIDING MULTIPLE EUV BEAMS FOR SEMICONDUCTOR PROCESSING", U.S. Pat. No. 9,541,839, granted 10 Jan. 2017 and titled "METHOD AND DEVICE FOR SPLITTING A HIGH-POWER LIGHT BEAM TO PROVIDE SIMULTANEOUS SUB-BEAMS TO PHOTOLITHOGRAPHY SCANNERS", U.S. Pat. No. 9,392,679, granted 12 Jul. 2016 and titled "METHOD, APPARATUS AND SYSTEM FOR USING FREE-ELECTRON LASER COMPATIBLE EUV BEAM FOR SEMICONDUCTOR WAFER PROCESSING", and/or U.S. Pat. No. 9,844,124, granted 12 Dec. 2017 and titled "METHOD, APPARATUS AND SYSTEM FOR USING FREE-ELECTRON LASER COMPATIBLE EUV BEAM FOR SEMICONDUCTOR WAFER METROLOGY", each of which is herein incorporated in its entirety by this reference.

The light source system 100 is preferably configured to perform the method of operation 400 described herein, but can additionally or alternatively have any other suitable functionality. The method of operation 400 is preferably performed using the light source system 100 described herein, but can additionally or alternatively be performed using any other suitable system(s).

2. Light Source System

2.1 Accelerator Modules

The light source system 100 preferably includes two or more accelerator modules 101 (e.g., wherein each accelerator module may be associated with one or more corresponding radiator modules 140). Each accelerator module 101 preferably functions to provide a beam 200 of high-energy (e.g., relativistic) electrons (e.g., providing the electron beam to the electron input 110). The accelerator module 101 can additionally or alternatively function to accept one or more electron beams (e.g., from the electron output), such as after the electron beam(s) are used for lasing.

The electron beam 200 preferably includes a plurality of electron bunches 210 (e.g., wherein the accelerator module is preferably a bunched-beam accelerator module, such as a radio-frequency (RF) accelerator module in which the accelerator drives the bunches using one or more RF fields), wherein each bunch preferably travels substantially along a beam path defined by the system 100 (e.g., wherein the system may define a plurality of such beam paths).

The electrons of each electron beam can define an electron energy (e.g., nominal electron energy), preferably on the order of hundreds of MeV (e.g., 600, 800, 1000, 1200, 1500, 300-100, and/or 1000-1300 MeV, etc). In a first specific example, an electron energy of 800 MeV can be used for generation of 13.5 nm light. In a second specific example, an electron energy of 1200 MeV can be used for generation of 6.7 nm light. However, the electrons can additionally or alternatively have any other suitable energy characteristics.

In some embodiments, the accelerator module 101 includes an electron beam injector and a linear accelerator system, and can optionally include an energy recovery system and/or an electron beam dump. In some such embodiments, the accelerator module 101 (and/or any elements thereof, including, without limitation, the electron beam injector, linear accelerator system, energy recovery system, and/or electron beam dump) can include one or more elements (and/or any suitable aspects thereof) such as described in U.S. patent application Ser. No. 14/803,068, filed 18 Jul. 2015 and titled "METHOD, APPARATUS AND SYSTEM FOR PROVIDING MULTIPLE EUV BEAMS FOR SEMICONDUCTOR PROCESSING", U.S. Pat. No. 9,541,839, granted Jan. 10, 2017 and titled "METHOD AND DEVICE FOR SPLITTING A HIGH-POWER LIGHT BEAM TO PROVIDE SIMULTANEOUS SUB-BEAMS TO PHOTOLITHOGRAPHY SCANNERS", U.S. Pat. No. 9,392,679, granted 12 Jul. 2016 and titled "METHOD, APPARATUS AND SYSTEM FOR USING FREE-ELEC- TRON LASER COMPATIBLE EUV BEAM FOR SEMI-CONDUCTOR WAFER PROCESSING", and/or U.S. Pat. No. 9,844,124, granted 12 Dec. 2017 and titled "METHOD, APPARATUS AND SYSTEM FOR USING FREE-ELEC-TRON LASER COMPATIBLE EUV BEAM FOR SEMI-CONDUCTOR WAFER METROLOGY", each of which is herein incorporated in its entirety by this reference. For example, the accelerator module 101 can include one or more elements such as described in U.S. patent application Ser. No. 14/803,068 regarding the 'superconducting accelerator' (e.g., the accelerator module 101 can be substantially identical to the 'superconducting accelerator' of U.S. patent application Ser. No. 14/803,068).

However, the accelerator module 101 can additionally or alternatively include any other suitable elements in any suitable arrangement.

2.2 Electron Input

The electron input 110 preferably functions to provide electrons (e.g., high energy electron bunches) for use in the system (e.g., providing the electrons to the splitter). The electron input preferably receives electron bunches from the accelerator modules 101 (or from any suitable subset thereof). The electron input can provide the electron bunches as a single electron beam (e.g., wherein electron bunches from multiple accelerator modules are merged into the single beam, such as by one or more kickers, such as a kicker of the electron input), can provide the electron bunches as multiple electron beams (e.g., each defining a different trajectory) such as a separate beam from each accelerator module (alternatively, some or all of these separate beams may include electron bunches from multiple accelerator modules, such as in some embodiments including more than two accelerator modules), and/or in any other suitable manner.

The electron input preferably provides the electron bunches to the splitter 120 (e.g., to a kicker 121 thereof). The electron bunches are preferably provided to the same location within the splitter (e.g., within the kicker thereof). For example, when the electron input is provided as multiple non-collinear electron beams, these beams preferably intersect (or substantially intersect) at (or near) a single point within the splitter (e.g., within the kicker, such as at a central point within the kicker at which the kicker's magnetic field is exerted upon the electron beams). However, the electron input can additionally or alternatively provide the electron bunches to the splitter in any other suitable manner, can provide the electron bunches to any other suitable portion of the system, and/or can be otherwise configured.

In some examples, the electron input may include one or more ancillary elements. For example, the ancillary elements can include elements such as phase matches, phase space exchanges, betatron matches, electron focusing optics (e.g., higher-order magnets, such as quadrupole, sextupole, etc.), compressors, path length adjustment modules (e.g., modules operable to statically and/or dynamically adjust the path length of one or more beam paths, such as to prevent and/or correct for phase offsets between different beam paths of the system), and/or any other suitable elements (e.g., elements operable to alter characteristics of the electron bunches). Further, the electron input 110 can additionally or alternatively include any other suitable elements in any suitable arrangement.

2.3 Splitter

The splitter 120 preferably functions to separate each of the one or more electron beams (e.g., received from the electron input) into a plurality of beams (or alternatively, to separate any suitable subset of these electron beams into a plurality of beams). The splitter 120 preferably includes one or more kickers 121 and/or septa 122, and optionally includes one or more deflectors 123.

The kicker 121 preferably includes (e.g., is) one or more dynamic electromagnetic field (EMF) generators. For example, the kicker 121 can include one or more superconducting radio frequency (SRF) kickers (e.g., as described in Akemoto, M., et al. "Construction and commissioning of the compact energy-recovery linac at KEK." *Nuclear Instruments and Methods in Physics Research Section A: Accelerators, Spectrometers, Detectors and Associated Equipment* 877 (2018): 197-219, in Leemann, C. W., et al. "The continuous electron beam accelerator facility: CEBAF at the Jefferson Laboratory." *Annual Review of Nuclear and Particle Science* 51.1 (2001): 413-450, and/or in Citron, A., et al. "The Karlsruhe—CERN superconducting rf separator." *Nuclear Instruments and Methods* 164.1 (1979): 31-55, each of which is herein incorporated in its entirety by this reference). In some embodiments, the kicker 121 can be configured to operate such as described below regarding the method 400; however, the kicker 121 can additionally or alternatively be operable in any other suitable manner.

In some embodiments, the splitter includes a single kicker. In other embodiments, the splitter includes multiple kickers (e.g., wherein all but the last such kicker is configured to deflect only a subset of electron bunches from the input electron beam, and the last kicker is configured to deflect the remaining electron bunches from the input electron beam, such that each kicker generates a subset of the plurality of beams generated at the splitter). However, the splitter can additionally or alternatively include any suitable number of kickers having any suitable arrangement and/or function.

The septum 122 preferably receives the plurality of electron beams (or any suitable subset thereof) from the kicker. Each septum preferably functions to redirect each of the received electron beams (e.g., redirecting each beam in a manner different from every other beam). For example, the septum can define a plurality of magnetic environments (e.g., separated from each other, such as by conductive walls), wherein each electron beam is received within a different one of these magnetic environments.

The septum preferably functions to direct each electron beam along the respective path defined by the input transport associated with that electron beam (e.g., such that each electron beam enters the desired radiator module). In some embodiments, the septum functions to increase the divergence of the received electron beams. However, the septum can additionally or alternatively decrease divergence between the beams, redirect beams in directions other than the direction defined by their incoming divergence (e.g., redirecting some or all beams out of plane, such as upward or downward), and/or direct some or all of the beams in any other suitable manner. Additionally or alternatively, in some examples the septum may redirect only a subset of the electron beams (e.g., wherein one or more electron beams are subjected to substantially zero magnetic field within the septum, and/or to a magnetic field defining substantially zero cross product with the electron beam trajectory).

In examples, the septa can include conventional current sheets, zero-force septa, Lambertson septa, and/or any other suitable elements. However, the splitter can additionally or alternatively include any other suitable septa. Further, a person of skill in the art will recognize that the splitter can additionally or alternatively include any other suitable element(s) configured to divert one or more electron beams (e.g., one or more of the electron beams received from the kicker), such as one or more bending magnet elements (e.g., dipole magnets).

In alternative embodiments, the splitter may not include a septum. For example, the splitter may rely solely on the beam divergence introduced by the kicker 121, and thus not include any additional elements configured to increase this beam divergence and/or otherwise redirect the electron beams.

In some embodiments, the splitter can include one or more deflectors 123. For example, in embodiments in which the splitter may receive multiple electron beams from the electron input (e.g., wherein these electron beams define a midline that bisects the angle between the beams), the splitter can include one or more deflectors operable to redirect one or more of those electron beams onto a trajectory collinear (or substantially collinear) with a midline defined by the splitter (e.g., wherein the midline bisects the angle between the multiple electron beams received at the splitter), such as shown by way of example in FIG. 3C. In some examples, while operating in a normal mode, the splitter may receive two electron beams, each offset from the midline in opposite directions by an angle θ; in this example, when operating in a backup mode, only one of these two electron beams may be received, and the splitter can include a deflector operable to redirect that beam by the angle θ onto the midline. For example, the deflector can be operable between: a normal mode, preferably in which no or substantially no deflection occurs; a first backup mode, in which the first beam is redirected onto the midline; and a second backup mode, in which the second beam is redirected onto the midline. Analogously, the splitter can include two deflectors, each operable between a normal mode (e.g., inactive mode, in which substantially no deflection occurs) and a backup mode (e.g., in which one of the beams is redirected onto the midline); for example, one of these two deflectors could be switched to the backup mode, in order to redirect the available beam onto the midline. In embodiments in which a combined beam is received at the splitter, such deflectors are preferably omitted (but can alternatively be included).

In some embodiments, the splitter can include one or more focusing elements (e.g., quadrupole magnets, higher order magnets such as sextupole and/or octupole magnets, etc.), such as including a focusing-defocusing (FODO) lattice (e.g., including an array of quadrupole magnets, such as quadrupole magnets of alternating polarities 199a, 199b). As the polarities of the quadrupoles within a FODO lattice typically alternates, so do the planes in which they focus and defocus, wherein, when arranged along and oriented with a shared lattice axis (e.g., wherein each quadrupole is arranged such that the shared lattice axis passes through the center of an aperture of each quadrupole), a quadrupole magnet 199a of a first polarity will typically focus within a first plane and defocus within a second plane orthogonal to the first plane, and a quadrupole magnet 199b of a second polarity, opposite the first polarity, will typically focus within the second plane and defocus within the first plane. The FODO lattice preferably defines a regular (or substantially regular) array of elements (e.g., quadrupole magnets), such as wherein the FODO lattice defines a period length (e.g., lattice spacing); the spacing between adjacent elements of the FODO lattice (e.g., adjacent quadrupole magnets, such as quadrupole magnets having opposite polarities from their nearest neighbors) is preferably equal (or substantially equal) to half the period length (e.g., wherein the spacing between quadrupole magnets having identical polarities is preferably equal or substantially equal to the period length). In some such embodiments, one or more other elements of the splitter (e.g., kicker 121, septum 122, etc.) may be arranged between such focusing elements (e.g., arranged within the FODO lattice, such as wherein each such element is arranged within a different cell of the FODO lattice), such as shown by way of example in FIGS. 2E-2H.

However, the splitter 120 can additionally or alternatively include any other suitable elements in any suitable arrangement, and/or the kicker and/or septum can additionally or alternatively have any other suitable configuration and/or functionality.

2.4 Input Transport

Each input transport 130 preferably functions to transport an electron beam (or alternatively, multiple electron beams) from the splitter to a respective radiator module. The system preferably includes one output transport for each radiator module (or for each electron beam path). The input transport preferably defines a transport path for the electron beam received from the splitter, wherein the beam is directed along that path to a radiator module configured to receive the electron beam. In some examples, the input transport (or any suitable subset thereof) can define an achromatic isochronous transport path (e.g., achromatic transport having an $R_{56}$ value substantially equal to zero), such as wherein the input transport carries pre-compressed electron bunches (e.g., wherein each electron bunch is compressed upstream of the input transport, such as at or before the electron input). In some alternate examples, the input transport (or any suitable subset thereof) can define a non-isochronous transport path (e.g., achromatic transport having an $R_{56}$ value substantially different from zero, such as substantially greater than zero), such as wherein the input transport performs electron bunch length compression (e.g., to create and/or enhance the peak current for FEL operation).

Each input transport preferably includes one or more bending magnets (e.g., dipole magnets), which can function to direct the electron beam into the associated radiator module (e.g., wherein the bending magnets of each input transport direct the electron beams onto substantially parallel trajectories to each other). Additionally or alternatively, the input transport can include one or more ancillary elements (e.g., phase matches, phase space exchanges, betatron matches, focusing optics, such as higher-order magnets, etc.). Further, each input transport can additionally or alternatively include any other suitable elements in any suitable arrangement.

2.5 Radiator Modules

The light source system 100 preferably includes a plurality of radiator modules 140 (e.g., one or more radiator modules associated with each accelerator module 101 of the system, such as configured to receive electron bunches from the associated accelerator module when the system operates in a normal mode). Each radiator module is preferably associated with a respective input transport and output transport (e.g., arranged between the input transport and the output transport). The radiator module preferably functions to receive one or more electron beams (e.g., from the splitter 120, preferably via an input transport 130 associated with the radiator module), to use each received electron beam to generate one or more light outputs, and/or to deliver the received electron beams (e.g., after use in generating the light outputs) downstream (e.g., to the recombiner 160, preferably via an output transport 150 associated with the radiator module).

Each radiator module preferably includes one or more undulator regions, wherein each undulator region includes one or more undulators. Each undulator region preferably functions to receive an electron beam and generate a light output (e.g., via free-electron lasing). In some embodiments, an undulator region can receive multiple spatially-separated electron beams (e.g., substantially parallel beams, divergent beams, convergent beams, and/or skew beams) and generate a respective light output from each received beam (or any suitable subset thereof); in examples, an undulator region can include a wide undulator that accepts multiple spatially-separated electron beams, and/or can include multiple undulators that accept the different electron beams (e.g., wherein each such undulator accepts a single electron beam).

Each radiator module can optionally include ancillary elements, such as electron optics (e.g., beam steering magnets such as dipole magnets, beam focusing magnets such as higher-order magnets, etc.) and/or photon optics (e.g., EUV optics configured to focus and/or redirect the generated light output(s)).

In some embodiments, one or more radiator modules (e.g., each radiator module of the system, or any suitable subset thereof) can each include one or more splitters 141 (e.g., analogous to the splitter 120 described herein, such as wherein the splitter 141 includes some or all elements of a splitter 120) and/or recombiners 142 (e.g., analogous to the recombiner 160 described herein, such as wherein the recombiner 142 includes some or all elements of a recombiner 160). For example, a radiator module can include a splitter 141 configured to separate an incoming electron beam (e.g., received from the splitter 120, such as via an input transport 130) into a plurality of electron beams (e.g., 2, 3, 4, 5, 6-10, 10-20, or more than 20 beams). A radiator module that includes a splitter 141 preferably also includes a recombiner 142 configured to recombine the plurality of electron beams generated by the splitter 141 into a single output beam (e.g., to be provided to the recombiner 160, such as via an output transport 150).

The splitter 141 preferably includes one or more kickers, septa, focusing elements (e.g., quadrupole magnets, higher order magnets such as sextupole and/or octupole magnets, etc.) and/or any other suitable elements. For example, the splitter can include a kicker configured to deflect electron bunches of the input beam onto different trajectories, thereby separating the input beam into multiple beams, followed by one or more septa and/or focusing elements configured to steer the separated beams (e.g., increasing the lateral separation between beams, collimating the beams, etc.). In examples, the focusing elements can include shared focusing elements (e.g., shared quadrupole that applies a single quadrupole field to a plurality of beams, such as to all the beams, preferably wherein the quadrupole field is arranged symmetrically on the beams such as being centered on a center of the array of beams) and/or individual focusing elements (e.g., individual quadrupole that applies a quadrupole field to only a single beam, such as centered on the desired beam location) such as wherein the splitter 141 includes an individual focusing element for each beam (e.g., applying a separate quadrupole field centered on the desired beam location). In some examples in which the separated beams emerging from the kicker are not evenly spaced (e.g., in examples in which the kicker separates the input beam into 5 or more beams), the splitter 141 may include one or more elements operable to achieve substantially even spacing between the separated beams; such elements can include, in examples: one or more septa configured to increase separation of the outer beams from the center (e.g., from a central axis defined by the input beam trajectory), one or more quadrupole elements configured to redirect beams toward a desired position (e.g., large-aperture individual-beam quadrupole elements), non-linear focusing elements (e.g., focusing elements including both quadrupole and octupole field components) configured to increase separation of the outer beams from the center, and/or any other suitable elements. Additionally or alternatively, different drift lengths can be employed for different beams after separation at the splitter 141 (e.g., while the beams are divergent, such as before collimation), such as wherein a first collimating element (or set of collimating elements) may collimate only a subset of the beams (e.g., inner beams) while a second set of one or more collimating elements may collimate the remaining beams (e.g., wherein the remaining beams all have the same drift length, greater than that of the beams collimated by the first collimating element; wherein different beams of the remaining beams have different drift lengths, such as wherein the outermost beams have the longest drift length; etc.). However, the splitter 141 can additionally or alternatively include any other suitable elements in any suitable arrangement.

The recombiner 142 preferably includes one or more kickers, septa, focusing elements (e.g., quadrupole magnets, higher order magnets such as sextupole and/or octupole magnets, etc.) and/or any other suitable elements. Within any particular radiator module, the recombiner 142 of that module preferably includes the same (or substantially the same) elements as the complementary splitter 141 of that module, but arranged in a substantially reversed (e.g., mirrored) arrangement to that of the complementary splitter 141. For example, if a splitter 141 of a radiator module includes a kicker configured to split the input beam into n separate beams, followed by a sequence of shared quadrupole elements, then septa configured to increase spacing of the outermost beams from the central axis, and finally individual quadrupole elements for each beam, then the complementary recombiner 142 of that module preferably includes individual quadrupole elements for each beam, then septa configured to decrease spacing of the outermost beams from the central axis, then a sequence of shared quadrupole elements (wherein the sequence is the reverse arrangement of that of the splitter 141), and finally a kicker configured to recombine n separate beams into a recombined beam.

However, the radiator modules can additionally or alternatively include any other suitable elements in any suitable arrangement.

2.6 Output Transport

Each output transport 150 preferably functions to transport an electron beam from a radiator module to the recombiner. The system preferably includes one output transport for each radiator module (or for each electron beam path); typically, the system will include the same number of output transports as input transports (e.g., wherein each input transport is associated with a corresponding output transport, both of which are preferably associated with the same radiator module). Each output transport preferably includes the same or substantially the same components as the corresponding input transport 130 (e.g., having substantially the same arrangement as the elements of the corresponding input transport, but in the reverse order), which can function to deliver each electron beam to the recombiner 160 (e.g., along a beam path mirroring or substantially mirroring the beam path defined by the corresponding input transport).

Figure 4:
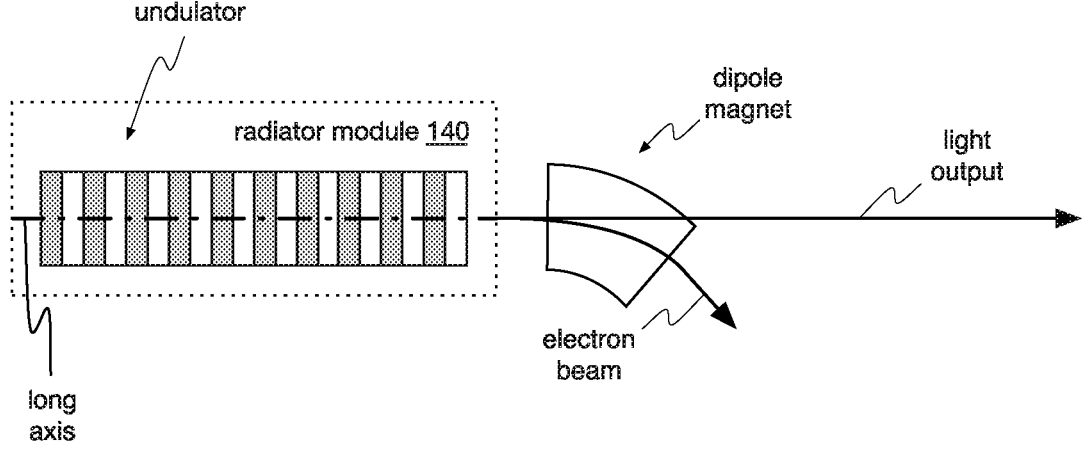
FIG. 4 is a schematic representation of a specific example of a second portion of the light source system.

The output transport preferably includes one or more bending elements (e.g., dipole magnets), which can function to divert the electron beam away from the path of the generated light output (and/or to direct the electron beam toward the recombiner), such as shown by way of example in FIG. 4.

In some examples, the output transport may include one or more ancillary elements. For example, the ancillary elements can include elements such as phase matches, phase space exchanges, betatron matches, electron focusing optics (e.g., higher-order magnets, such as quadrupole, sextupole, etc.), compressors, path length adjustment modules, and/or any other suitable elements (e.g., elements operable to alter characteristics of the electron bunches).

However, each output transport can additionally or alternatively include any other suitable components and/or have any suitable arrangement thereof.

2.7 Recombiner

The recombiner 160 preferably functions to recombine the electron beams, more preferably recombining them into the same number of beams as were received at the electron input. Further, the recombiner can function to provide these recombined beams to one or more of the accelerator modules (e.g., to energy recovery loops thereof). The recombiner preferably includes one or more septa 161 and kickers 162, and optionally includes one or more deflectors 163.

The septum 161 preferably functions to direct each electron beam to converge (or substantially converge) at (or near) a single point within the kicker 162. The septum 161 can include any suitable elements such as described above regarding the septum 122, and is preferably substantially identical to the septum 122, but can additionally or alternatively include any other suitable elements in any suitable arrangement.

In alternative embodiments, the recombiner may not include a septum. For example, the recombiner may receive the plurality of electron beams as a set of convergent beams defining sufficiently low angles between each other that the kicker 162 is operable to recombine these convergent electron beams alone, and thus not include any additional elements configured to decrease the angle between beams (and/or otherwise redirect the electron beams) prior to recombination at the kicker 162.

The kicker 162 preferably functions to recombine the received electron beams (e.g., into the same number of beams as were received at the electron input), and/or to provide the electron beams to one or more accelerator modules. The kicker 162 can include any suitable elements such as described above regarding the kicker 121, and is preferably substantially identical to the kicker 121, but can additionally or alternatively include any other suitable elements in any suitable arrangement.

The deflector(s) 163, if included, preferably perform an analogous role to that described above regarding the deflector(s) 123. For example, during normal operation, the kicker 162 may output two divergent beams bisected by a midline (e.g., same midline as defined by the splitter or a different midline), but during backup operation, the kicker 162 may output only a single beam (e.g., along or substantially along the midline); in this example, in the backup mode, the deflector(s) can function to redirect the single beam onto the same path it would take during normal operation (e.g., redirecting the beam from the midline onto one of the two paths taken by the diverging beams during normal operation).

In some embodiments, the recombiner includes the same or substantially the same components as the splitter (e.g., having substantially the same arrangement as the elements of the splitter, but in the reverse order), which can function to recombine the electron beams and deliver the recombined beam(s) to the electron output (e.g., along a beam path mirroring or substantially mirroring the beam path defined by the splitter). In a variant of such embodiments, the splitter includes multiple kickers, wherein each such kicker is responsible for generating a different set of one or more beams of the plurality of beams generated at the splitter. In this variant, the order of the corresponding kickers of the recombiner may not be reversed, but rather recombining beams may be performed in the same order in which the beams were generated (e.g., thereby enabling the system to provide equal path lengths for all such beams); preferably, any suitable elements associated with such kickers (e.g., septa and/or focusing elements configured to interact with beams redirected by these kickers) are collocated with the kicker they are associated with (e.g., maintaining the complementary, reversed arrangement between the kicker and associated elements as in the splitter).

In some examples, the recombiner may include one or more ancillary elements. For example, the ancillary elements can include elements such as phase matches, phase space exchanges, betatron matches, electron focusing optics (e.g., higher-order magnets, such as quadrupole, sextupole, etc.), compressors, path length adjustment modules, and/or any other suitable elements (e.g., elements operable to alter characteristics of the electron bunches).

However, the recombiner can additionally or alternatively include any other suitable components and/or have any suitable arrangement thereof.

2.8 Electron Output

The electron output 170 preferably functions to receive electrons (e.g., high energy electron bunches) after use in the system (e.g., receiving the electrons from the recombiner). The electron output preferably receives the electron bunches from the recombiner 160 (e.g., from the kicker 162 thereof). The electron output preferably provides the received electron bunches to the accelerator modules 101 (or any suitable subset thereof), such as to energy recovery loops thereof; more preferably, the electron output provides each received electron bunch to the same accelerator module from which it originated. The electron output can receive the electron bunches as a single electron beam (e.g., wherein this single beam is later separated into distinct beams, preferably one beam for each accelerator module, such as by one or more kickers, such as a kicker of the electron output), can receive the electron bunches as multiple electron beams (e.g., each defining a different trajectory) such as a separate beam for each accelerator module (alternatively, some or all of these separate beams may include electron bunches for multiple accelerator modules, such as in some embodiments including more than two accelerator modules), and/or in any other suitable manner.

In some examples, the electron output may include one or more ancillary elements. For example, the ancillary elements can include elements such as phase matches, phase space exchanges, betatron matches, electron focusing optics (e.g., higher-order magnets, such as quadrupole, sextupole, etc.), compressors, path length adjustment modules, and/or any other suitable elements (e.g., elements operable to alter characteristics of the electron bunches). Further, the electron input 110 can additionally or alternatively include any other suitable elements in any suitable arrangement.

2.9 Ancillary Elements

The system can optionally include one or more ancillary elements. These elements can include one or more phase matches, phase space exchanges, betatron matches, compressors, decompressors, electron optics elements, such as focusing optics (e.g., higher-order magnets such as quadrupoles, sextupoles, etc.), path length adjustment modules, and/or any other suitable elements in any suitable arrangement. Further, the light source system 100 can additionally or alternatively include any other suitable elements in any suitable arrangement.

2.10 Exemplary Embodiments

In a first embodiment, the electron input 110 is configured to provide an electron beam (e.g., combined electron beam, such as from two or more accelerator modules) to the splitter (e.g., as shown in FIGS. 1A, 1C, 2A, 2B, 2C, and/or 2D). In some variants of this embodiment (e.g., in variants in which electron beams are provided multiple accelerator modules), the electron input can optionally include one or more kickers and/or other elements configured to receive electron beams from multiple accelerator modules and combine them into a single beam. In such variants, the electron input preferably includes a shared betatron match configured to perform betatron matching on the combined electron beam. Alternatively, in variants of this embodiment in which only a single electron beam is received (e.g., from a single accelerator module), the electron input can optionally function to direct the received electron beam to the kicker. The electron beam from the electron input (e.g., combined electron beam) preferably enters the kicker 121 as a single beam. The recombiner preferably recombines all of the electron beams into a single beam (e.g., for subsequent separation into multiple beams to be provided to multiple accelerator modules, such as subsequent separation at a kicker of the electron output). Alternatively, the recombiner can combine the electron beams into a larger number of recombined beams (e.g., equal to the number of accelerator modules providing accelerated electron bunches to the electron input).

Figure 1B:
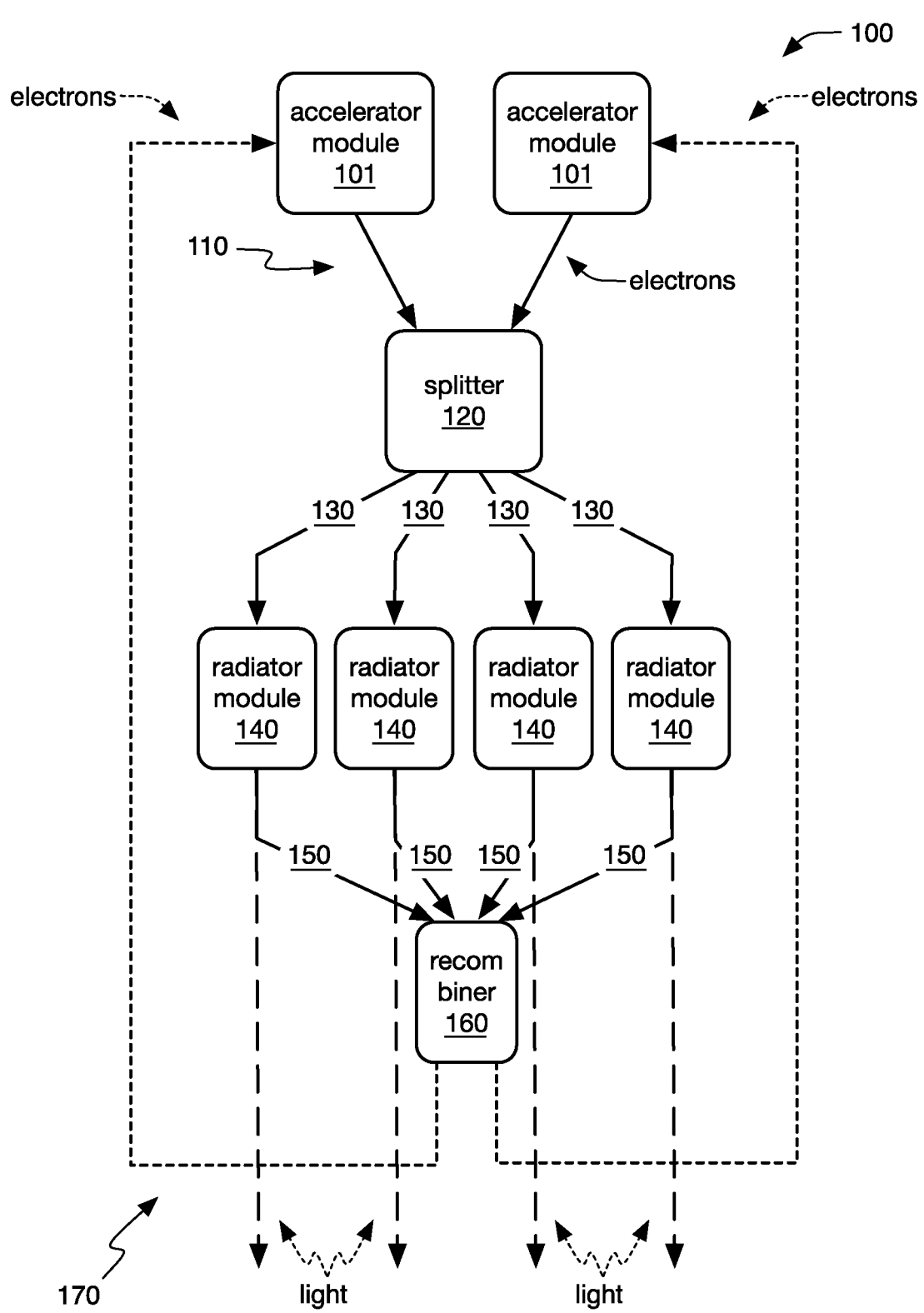
Figure 1C:
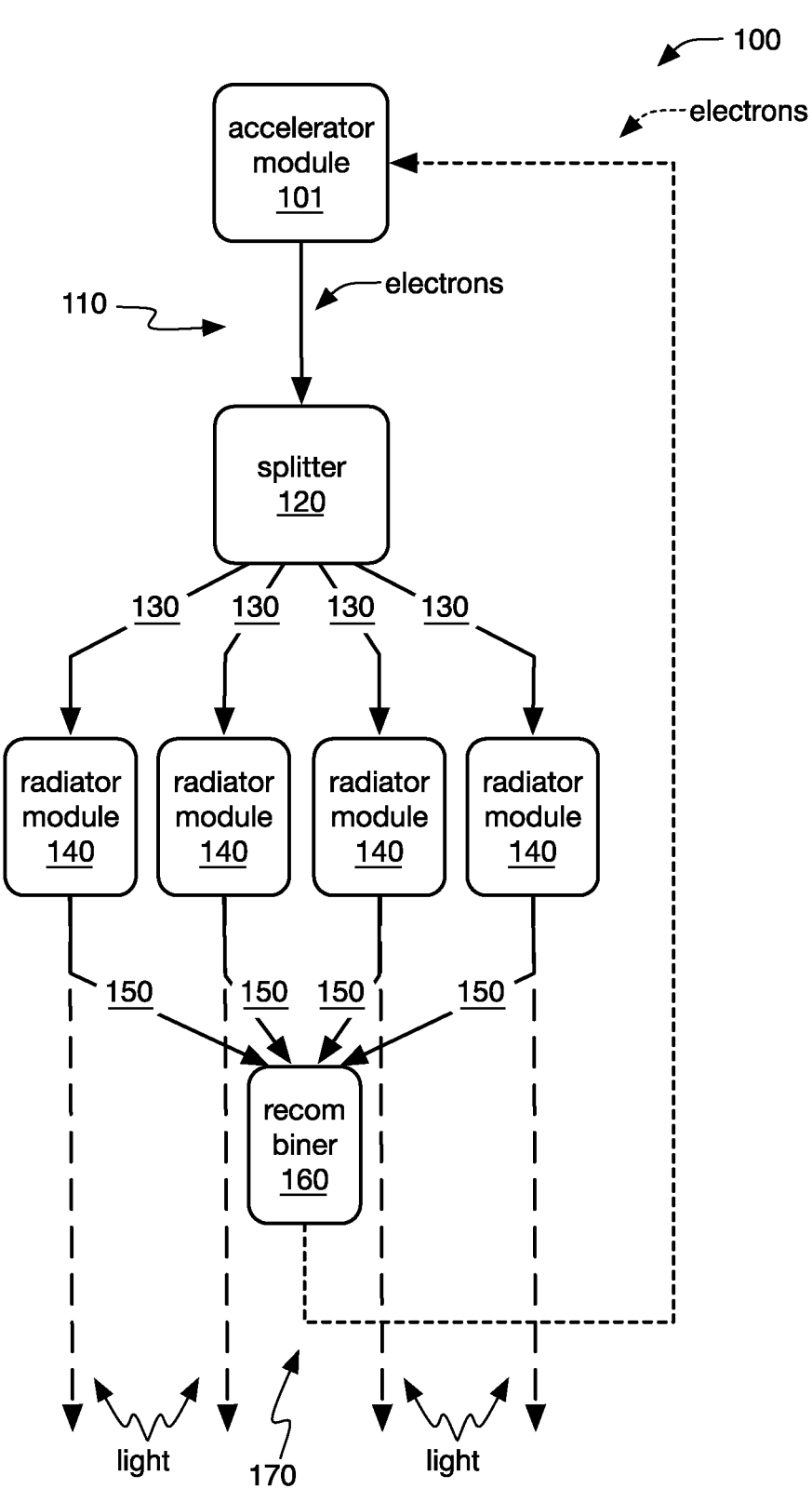
Figure 3A:
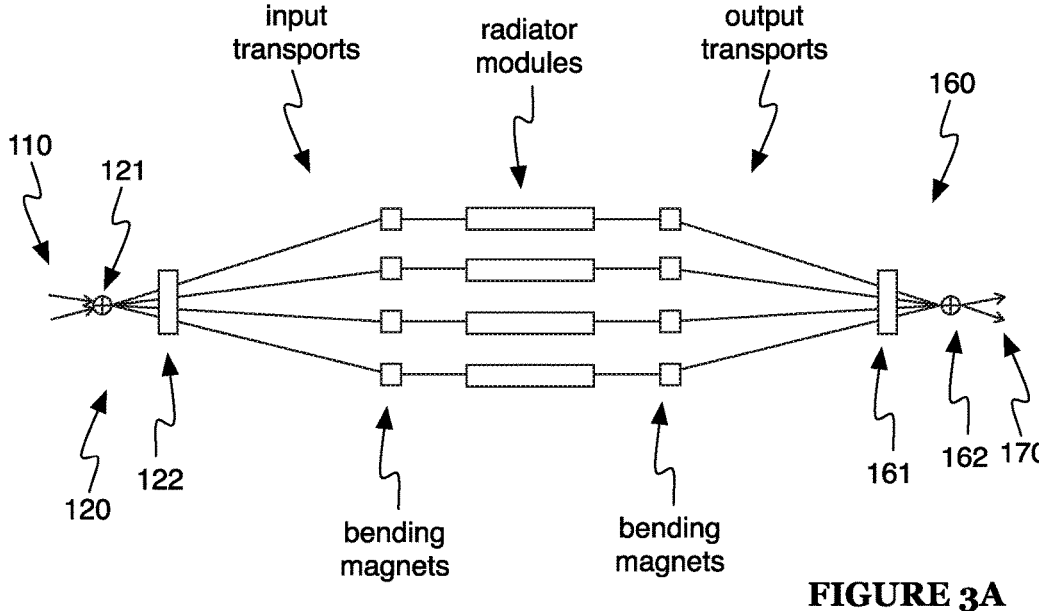
FIGS. 3A-3B are schematic representations of a second embodiment and a specific example of the second embodiment, respectively, of a portion of the light source system.
Figure 3B:
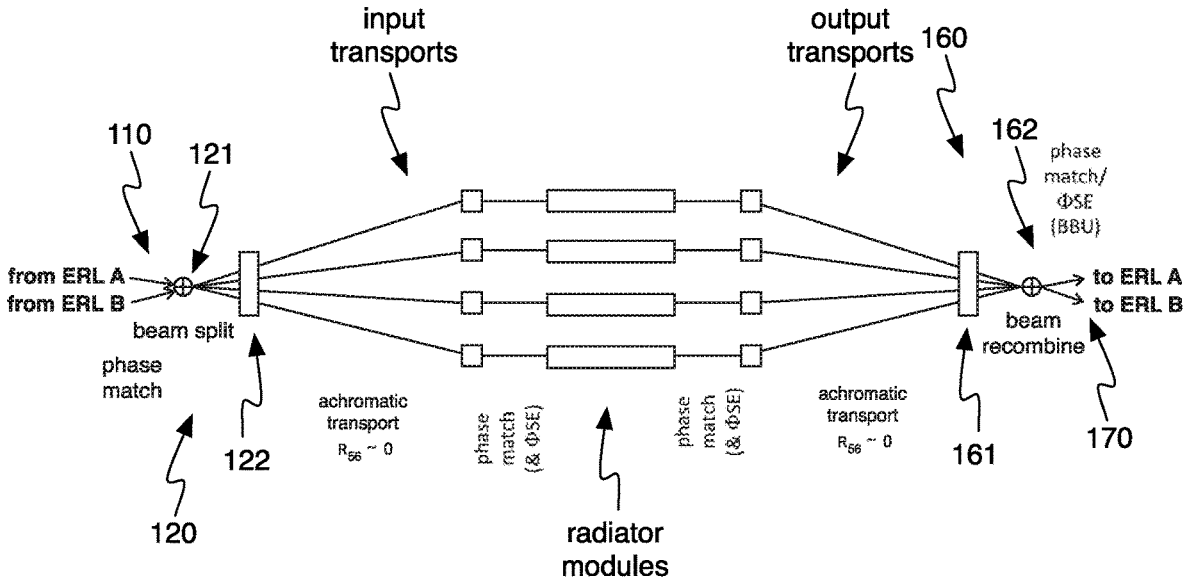
Figure 3C:
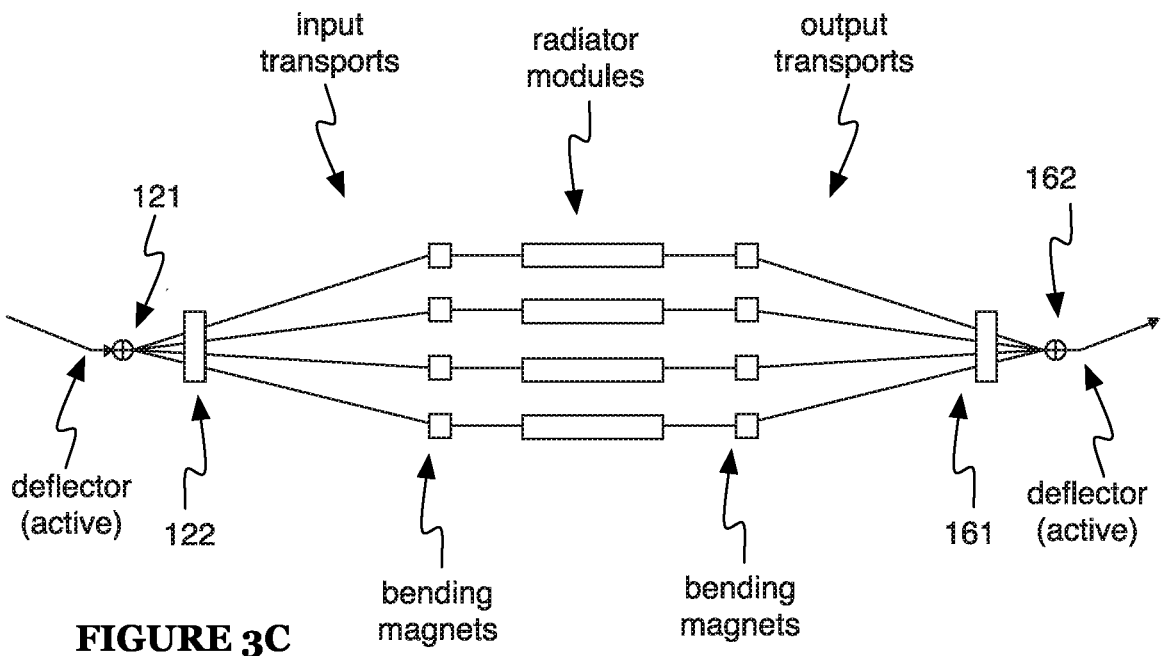
FIG. 3C is a schematic representation of an example of operating the second embodiment of the portion of the light source system in a backup mode.

In a second embodiment, the electron input provides separate (e.g., non-collinear) electron beams to the splitter (e.g., providing a separate electron beam from each of two accelerator modules or more than two accelerator modules), such as shown by way of examples in FIGS. 1B, 3A, and/or 3B. In this embodiment, the beams preferably cross (e.g., are coincident or substantially coincident) at (or near) a single point within the kicker 121. As the beams are not combined, the electron input (and/or any other suitable elements of the system) preferably includes a separate betatron match for each of these electron beams; these betatron matches are preferably arranged upstream of the region near the kicker 121 (e.g., with the final focusing magnets arranged meters or tens of meters upstream of the crossing point), so that the beams are sufficiently far apart to allow for placements of separate electron optics for each beam without occluding or otherwise interfering with the other beam(s). In this embodiment, the recombiner preferably combines the electron beams from the output transport into the same number of beams as were provided by the electron input (e.g., a separate electron beam for each accelerator module). However, the recombiner can alternatively combine all electron beams into a single output beam (e.g., for downstream separation into multiple beams, such as a beam directed to each accelerator module) and/or any other suitable number of beams.

In a first variation of the system, all radiator modules (e.g., and all electron beams, such as throughout the course of their transport through the system) are coplanar (or substantially coplanar), such as being arranged at the same (or substantially the same) height. In a second variation of the system, the radiator modules are not all coplanar (e.g., wherein vertical separation exists between some of the radiator modules). In some examples of this variation, different kickers of the splitter can deflect the electron beams along different planes; additionally or alternatively, in some examples of this variation, the splitter can direct some or all of the electron beams out of plane (e.g., upward and/or downward), such as wherein the kicker creates in plane divergence between the beams, and then the septum directs some or all of the beams out of plane. In some examples of this variation, all of the beam paths may be equal or substantially equal in length; however, the beam path lengths may alternatively differ from one another.

In some examples, the splitter can include a plurality of kickers (e.g., two kickers). In a first such example (e.g., example of the first embodiment, in which the splitter receives a single electron beam from the electron input), a first kicker can separate a portion of the incoming electron beam into two additional beams, preferably while leaving a remainder of the incoming electron beam unperturbed (or substantially unperturbed), and a second kicker separates the remainder (or any suitable subset thereof) of the incoming electron beam into two more beams (e.g., as shown by way of examples in FIGS. 2C, 2D, and/or 2E-2H).

Each kicker preferably redirects electron bunches substantially within a respective plane (e.g., wherein electrons entering the kicker perfectly along a central axis of the kicker will be deflected exactly or essentially within the respective plane; whereas deviations in incoming trajectory may result in deviations in deflection vectors, possibly such that these deflection vectors do not lie within the respective plane). In examples, the respective deflection plane for each kicker can be the same (or substantially the same) as the other kickers, different than the other kickers (e.g., wherein such planes are orthogonal or substantially orthogonal; wherein such planes define an oblique angle, such as 5°, 10°, 15°, 18°, 22.5°, 24°, 30°, 36°, 40°, 45°, 60°, 720, 0.5°-1°, 1-2°, 2-5°, 5-10°, 10-20°, 20-30°, 30-45°, 45-60°, 60-75°, 75-85°, substantially greater than 0°, and/or substantially less than 90°, etc.; wherein such planes are parallel or substantially parallel but not coplanar; etc.). In examples in which the deflection planes for two kickers are not coplanar and not parallel, the intersection of these two deflection planes preferably defines an electron beam propagation vector (e.g., wherein the input electron beam and/or recombined output beam propagates substantially along the propagation vector for some or all of its path through the splitter and/or recombiner, such as at its entry to the first splitting kicker and/or at its exit from the last recombining kicker); analogously, each of the two kickers can define one or more deflection vectors (e.g., defining directions along which the trajectories of electron bunches deflected by the kicker may be deflected, such as wherein the deflection results in a linear combination of the incoming electron bunch trajectory and the deflection vector), which are preferably orthogonal (or substantially orthogonal) to an electron beam propagation vector (e.g., along which the input electron beam and/or recombined output beam propagates for some or all of its path through the splitter and/or recombiner, such as at its entry to the first splitting kicker and/or at its exit from the last recombining kicker). However, these electron beams can additionally or alternatively propagate in any suitable directions.

In some variants, some or all such deflection planes may be different (e.g., substantially different) from one or more planes defined by the accelerator module(s), such as a broad plane that contains (or substantially contains) a majority of the electron beam propagation path within an accelerator module, a plane that contains the electron beam propagation path within one or more arcs of the accelerator module, and/or any other suitable plane (e.g., broad plane) defined by the accelerator module(s). Additionally or alternatively, in some variants, some or all such deflection planes may not be normal (or substantially normal) to a gravity vector (e.g., may not be horizontal relative to the force of gravity), such as in situations in which the accelerator module(s) are arranged on one or more planes that are substantially normal to the gravity vector (e.g., are substantially horizontal). In some such variants, having these deflection planes differ from the planes defined by the accelerator module(s) and/or the gravity vector can function to arrange the beams (e.g., the electron beams and/or the resulting optical beams generated by free-electron lasing from the electron beams) and/or elements associated therewith (e.g., undulators; electron beam control elements such as focusing elements, kickers, septa, etc.; optical beam control elements such as mirrors; etc.) in a manner in which they do not interfere with (e.g., intersect) the accelerator module(s) (e.g., the arcs thereof). However, the deflection plane(s) can additionally or alternatively have any other suitable orientation(s). A person of skill in the art will recognize that the use of such deflection plane(s) that differ from the planes defined by the accelerator module(s) and/or the gravity vector can additionally or alternatively be applied in other examples and/or embodiments (e.g., in which the splitter includes only a single kicker, in which the splitter receives multiple spatially-separated electron beams, etc.).

Figure 2A:
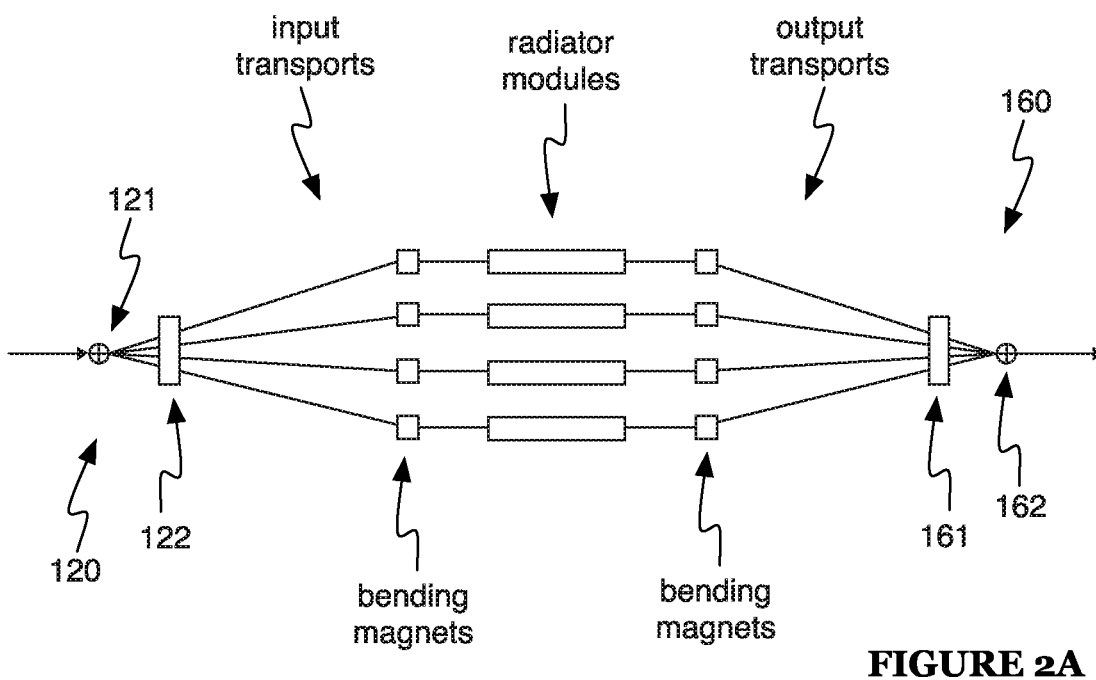
FIGS. 2A-2B are schematic representations of a first variant of a first embodiment and a specific example of the first variant, respectively, of a portion of the light source system.
Figure 2B:
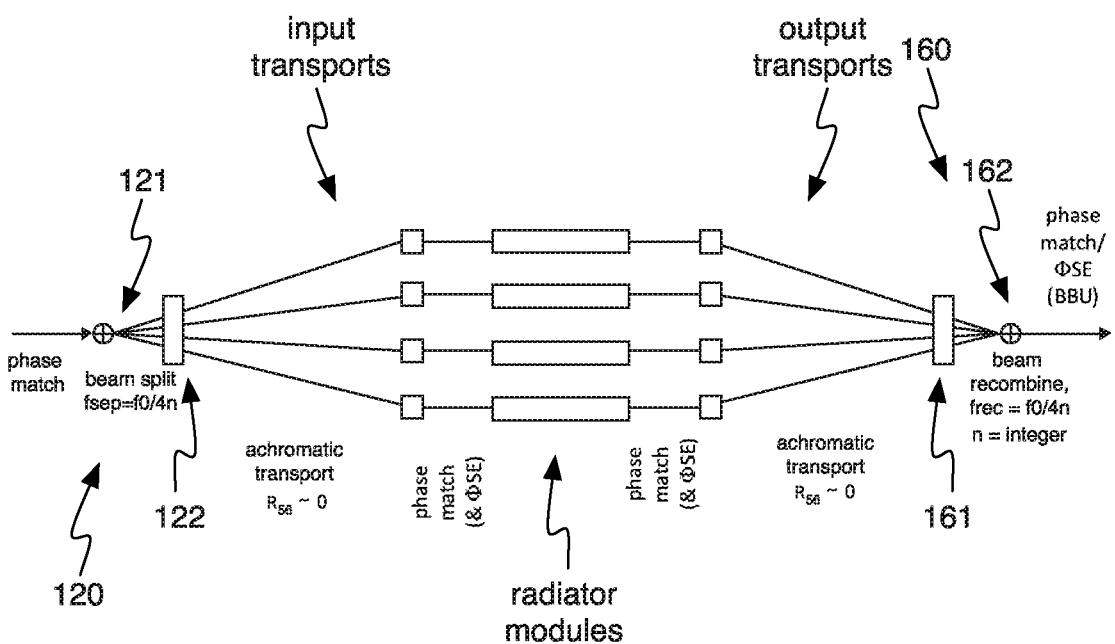
Figures 2C, 2D:
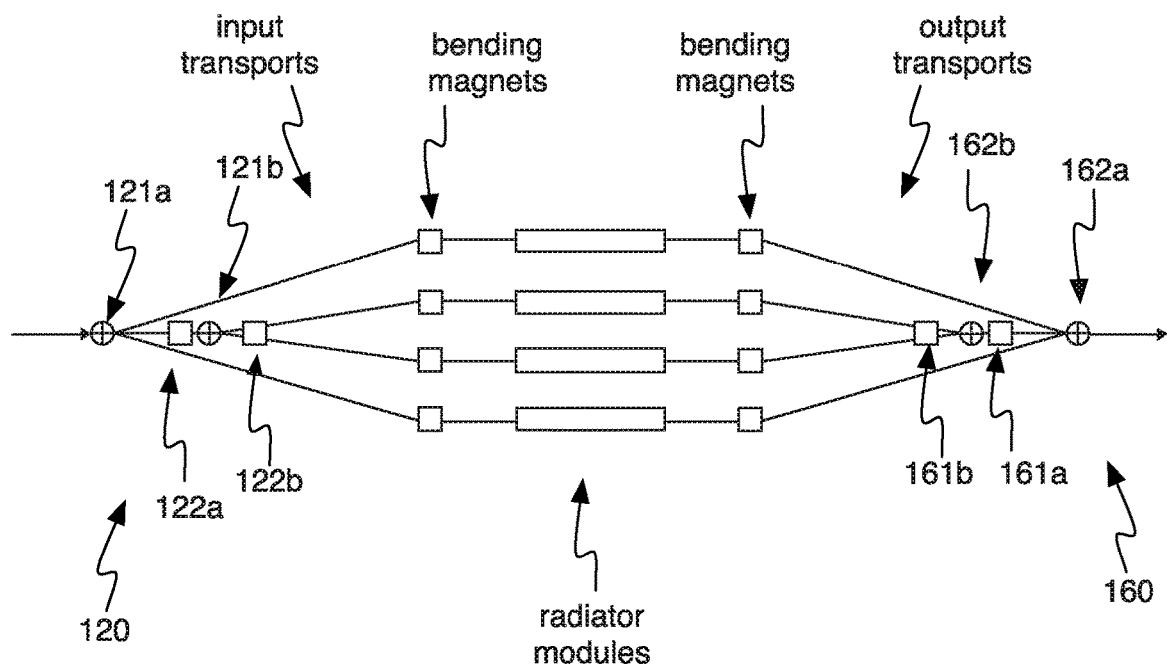
FIGS. 2C-2D are schematic representations of a second variant of the first embodiment and a specific example of the second variant, respectively, of a portion of the light source system.

In a first specific example of this first example, all kickers of the splitter (e.g., the first and second kickers) define substantially identical deflection planes (e.g., all kickers of the splitter deflect electron bunches substantially within a single plane), such as shown by way of examples in FIGS. 2C-2D. The deflection plane can be the same (or substantially the same) as a plane defined by the accelerator module(s) (e.g., plane defined by one or more arcs thereof) and/or by the gravity vector, can be parallel to such a plane, or can be oriented at an angle (e.g., orthogonal angle, such as wherein the deflection plane is substantially vertical; oblique angle such as 5°, 10°, 15°, 30°, 45°, 60°, 75°, 0.1-1°, 1-5°, 5-15°, 15-45°, 45-85°, and/or less than 90°; etc.) to such a plane. In some variations of this first specific example, the splitter includes a plurality of septa (e.g., one or more associated with each kicker, wherein each septum associated with a particular kicker preferably increases the separation between beams deflected by that kicker, more preferably while not substantially changing the trajectory of electron bunches not deflected by that kicker).

In one such variation (e.g., as shown in FIGS. 2C-2D), at the splitter, a first separating kicker 121a deflects a portion of an input beam, generating a first and second electron beam (depicted on either side of the input beam), and is associated with a first set of one or more separating septa 122a that function(s) to increase the deflection of the first and second electron beams away from a central axis defined by the input beam (e.g., without substantially deflecting the input beam); further, a second separating kicker 121b deflects the remainder of the input beam, generating a third and fourth electron beam (depicted between the first and second electron beams, on either side of the central axis), and is associated with a second set of separating septa 122b that function(s) to increase the deflection of the third and fourth electron beams away from the central axis. Note that the first set of separating septa may have any suitable arrangement relative to the second separating kicker (e.g., each such septum may be upstream of, downstream of, or at the same position along the central axis as the second separating kicker; may be between the first and second separating kickers, or between the second separating kicker and a separating septum of the second set; etc.). Following beam propagation through the input transports, the radiator modules, and the output transports, at the recombiner, a second set of one or more recombining septa 161b functions to decrease the deflection between the third and fourth electron beams and the central axis, directing the third and fourth electron beams toward a second recombining kicker 162b (with which it is associated) that functions to recombine the third and fourth electron beams into a single beam (e.g., propagating substantially along the central axis); further, a first set of one or more recombining septa 161a (e.g., wherein each septum thereof may be arranged upstream of, downstream of, or at the same position along the central axis as the second recombining kicker; may be between the first and second recombining kickers, or between the second separating kicker and a separating septum of the second set; etc., preferably wherein the recombiner has the reverse arrangement of the splitter) functions to decrease the deflection between the first and second electron beams and the central axis, directing the first and second electron beams toward a first recombining kicker 162a (with which it is associated) that functions to recombine the first and second electron beams with the recombined beam output by the second recombining kicker.

In a second specific example of this first example, the different kickers of the splitter (e.g., the first and second kickers), define substantially different deflection planes from each other (e.g., parallel planes and/or intersecting planes), such as shown by way of example in FIGS. 2E-2H. For example, the deflection plane defined by the first kicker can be orthogonal to the deflection plane defined by the second kicker, or the two planes can define an oblique angle between them (e.g., 5°, 10°, 15°, 30°, 45°, 60°, 75°, 0.1-1°, 1-5°, 5-15°, 15-45°, 45-85°, and/or less than 90°, etc.). In some variations, one of these planes may be the same as a plane defined by the accelerator module(s) (e.g., plane defined by one or more arcs thereof) and/or by the gravity vector. Additionally or alternatively, one or both of these deflection planes can be parallel to the plane defined by the accelerator module(s) and/or by the gravity vector, and/or can be oriented at an angle (e.g., orthogonal angle, oblique angle such as 5°, 10°, 15°, 30°, 45°, 60°, 75°, 0.1-1°, 1-5°, 5-15°, 15-45°, 45-85°, and/or less than 90°, etc.) to such a plane. For example, the intersection between the two deflection planes can lie within the plane defined by the accelerator module(s) and/or by the gravity vector can intersect (and/or substantially intersect), such as wherein the angle (e.g., acute angle, obtuse angle, right angle) between the two deflection planes is bisected (or substantially bisected) by the plane. For example, the two deflection planes can be orthogonal to each other and define 45° angles with the plane defined by the accelerator module(s) and/or by the gravity vector. In some variations of this second specific example, the splitter includes a plurality of septa (e.g., one or more associated with each kicker, wherein each septum associated with a particular kicker preferably increases the separation between beams deflected by that kicker, more preferably while not substantially changing the trajectory of electron bunches not deflected by that kicker).

Figure 2E:
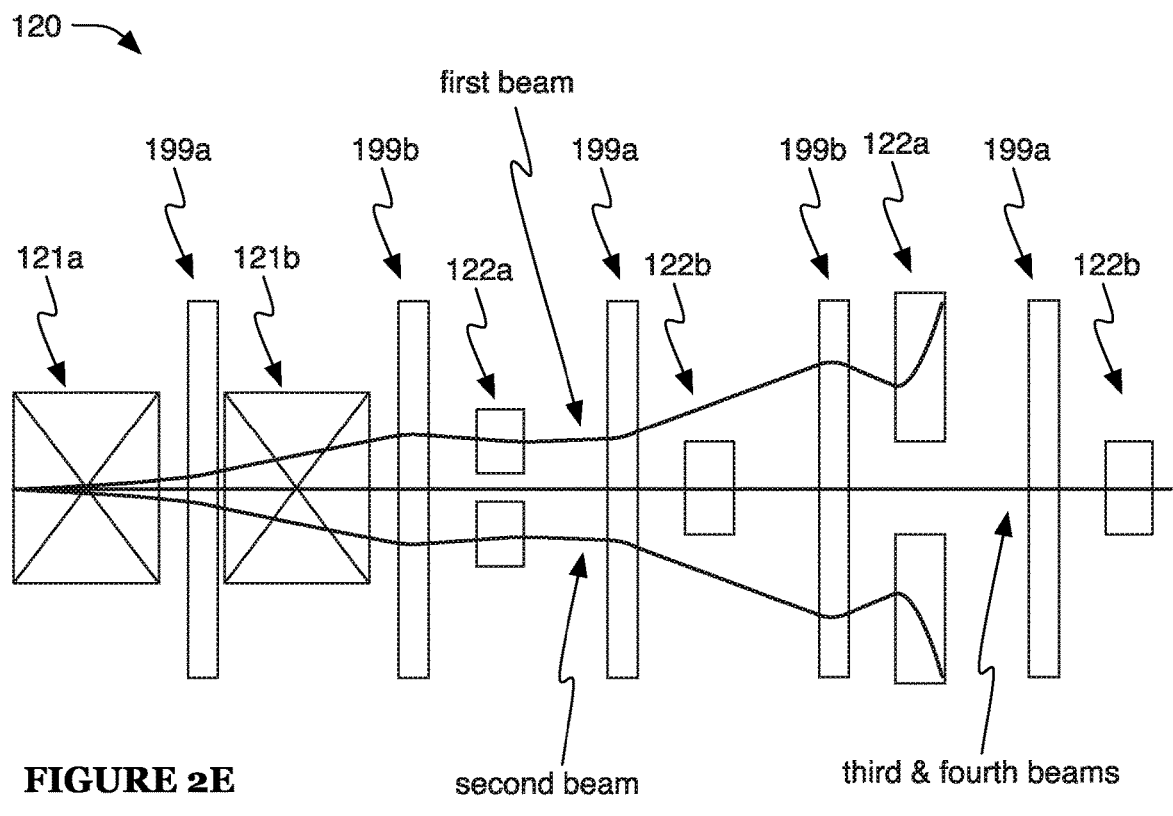
FIGS. 2E-2F are schematic representations of a projection onto a first and second deflection plane, respectively, of a specific example of a splitter of the light source system.
Figure 2F:
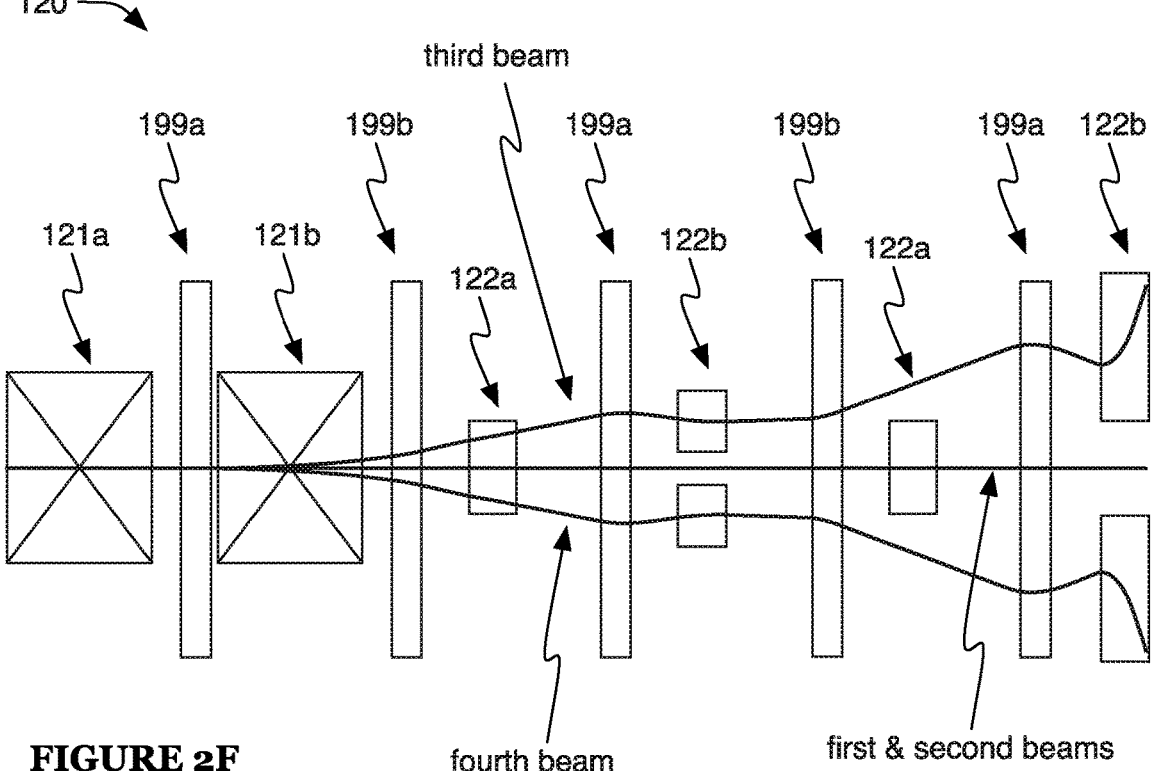
Figure 2G:
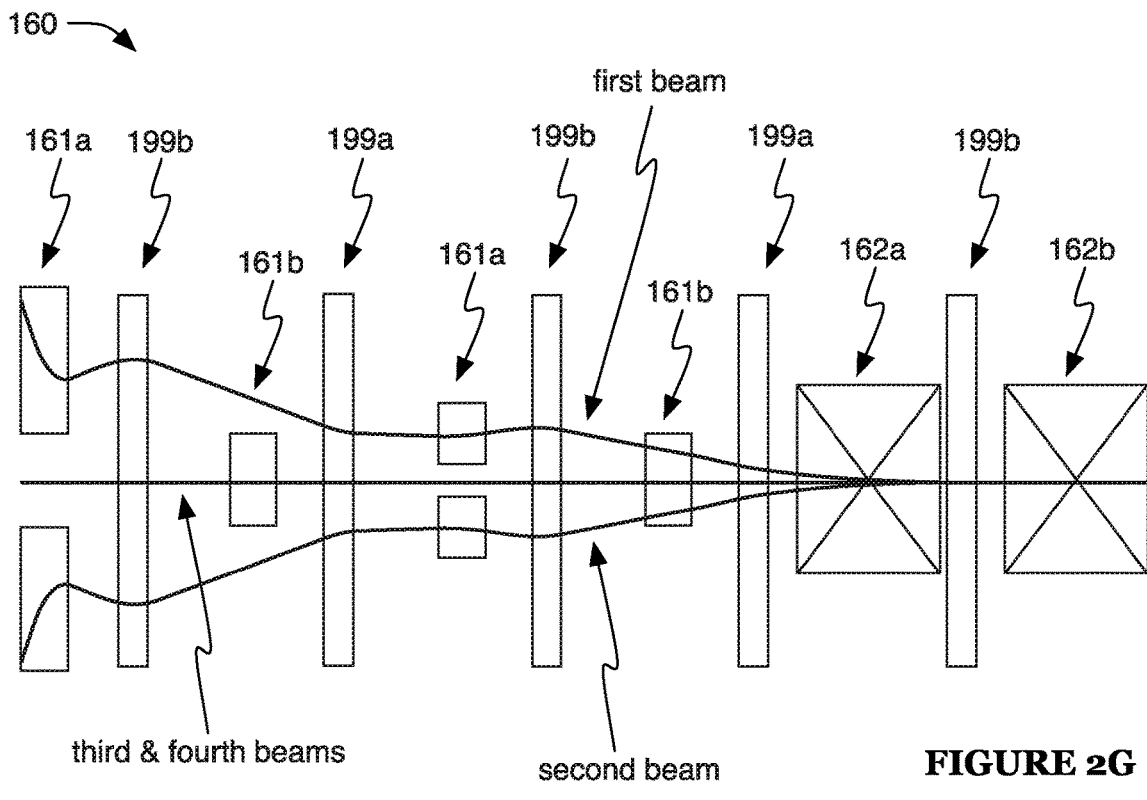
FIGS. 2G-2H are schematic representations of a projection onto a first and second deflection plane, respectively, of a specific example of a recombiner of the light source system.
Figure 2H:
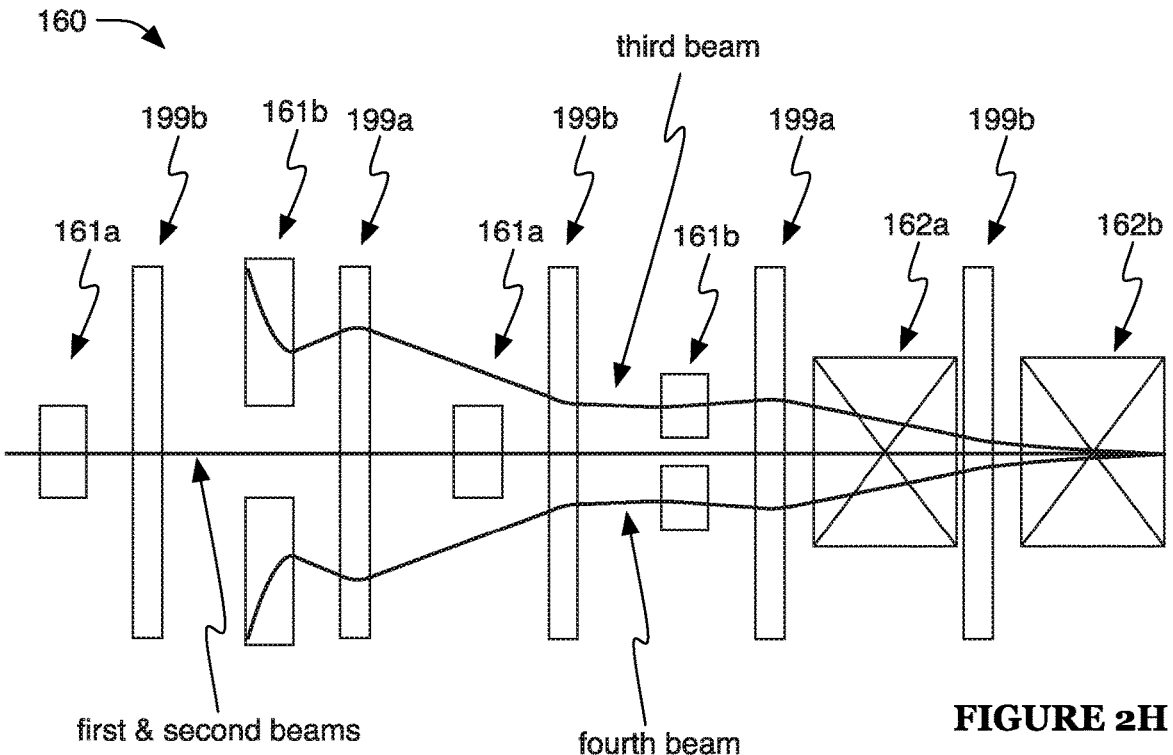

In one such variation (e.g., as shown in FIGS. 2E-2H), at the splitter, a first separating kicker 121*a* deflects a portion of an input beam, generating a first and second electron beam (depicted on either side of the input beam), and is associated with a first separating septum 122*a* that functions to increase the deflection of the first and second electron beams away from a central axis defined by the input beam (e.g., without substantially deflecting the input beam), such as shown by way of example in FIG. 2E, which depicts a projection of the splitter onto a first splitter deflection plane defined by the first separating kicker; further, a second separating kicker 121*b* deflects the remainder of the input beam, generating a third and fourth electron beam (non-coplanar with the first and second electron beams, such as propagating along a plane substantially orthogonal to the plane on which the first and second electron beams propagate), and is associated with a second separating septum 122*b* that functions to increase the deflection of the third and fourth electron beams away from the central axis, such as shown by way of example in FIG. 2F, which depicts a projection of the splitter onto a second splitter deflection plane (e.g., orthogonal or substantially orthogonal to the first splitter deflection plane) defined by the second separating kicker. Note that the first separating septum may have any suitable arrangement relative to the second separating kicker (e.g., may be upstream of, downstream of, or at the same position along the central axis as the second separating kicker; may be between the first and second separating kickers, or between the second separating kicker and a separating septum of the second set; etc.). Following beam propagation through the input transports, the radiator modules, and the output transports, at the recombiner, a first set of recombining septa 161*a* functions to decrease the deflection between the first and second electron beams and the central axis, directing the first and second electron beams toward a first recombining kicker 162*a* (with which it is associated) that functions to recombine the first and second electron beams into a single beam (e.g., propagating substantially along the central axis), such as shown by way of example in FIG. 2G, which depicts a projection of the recombiner onto a first recombiner deflection plane (e.g., coplanar with, parallel to, or arranged at an angle to the first splitter deflection plane and/or to the second splitter deflection plane) defined by the first recombining kicker; further, a second set of recombining septa 161*b* (e.g., each of which may be arranged upstream of, downstream of, or at the same position along the central axis as the second recombining kicker; may be between the first and second recombining kickers, or between the second separating kicker and a separating septum of the first set; etc., preferably wherein each set of septa and the associated kicker have the reverse arrangement of the analogous group of elements of the splitter, but wherein the groups of elements are preferably arranged in the same order as in the splitter) functions to decrease the deflection between the third and fourth electron beams and the central axis, directing the third and fourth electron beams toward a second recombining kicker 162*b* (with which it is associated) that functions to recombine the third and fourth electron beams with the recombined beam output by the second recombining kicker, such as shown by way of example in FIG. 2H, which depicts a projection of the recombiner onto a second recombiner deflection plane (e.g., orthogonal or substantially orthogonal to the first recombiner deflection plane; coplanar with, parallel to, or arranged at an angle to the first splitter deflection plane and/or to the second splitter deflection plane) defined by the second recombining kicker.

In some examples of this variation (e.g., in which the deflection planes defined by the first and second splitting kickers are substantially orthogonal), the splitter and recombiner preferably each include a FODO lattice, such as wherein each of the elements described above is arranged between two quadrupole magnets of the FODO lattice (e.g., each element described above is arranged at a distance substantially equal to half the period length of the FODO lattice). For example, in the splitter: the first splitting kicker can be followed by a first quadrupole magnet that defocuses in the deflection plane of the first splitting kicker ("first deflection plane") (e.g., while focusing in the deflection plane of the second splitting kicker ("second deflection plane")); the second splitting kicker can be arranged between the first quadrupole magnet and a second quadrupole magnet that focuses in the first deflection plane (e.g., while defocusing in the second deflection plane); a splitting septum 122*a* of the first set can be arranged between the second quadrupole magnet and a third quadrupole magnet (e.g., having the same polarity as the first quadrupole magnet); a splitting septum 122*b* of the second set can be arranged between the third quadrupole magnet and a fourth quadrupole magnet (e.g., having the same polarity as the second quadrupole magnet); another splitting septum 122*a* of the first set can be arranged between the fourth quadrupole magnet and a fifth quadrupole magnet (e.g., having the same polarity as the first quadrupole magnet); and/or another splitting septum 122*b* of the second set can be arranged after the fifth quadrupole magnet. In this example, the elements of the recombiner can optionally be arranged within a FODO lattice in an analogous manner. For example, in the recombiner: a recombining septum 161*a* of the first set can be followed by a sixth quadrupole magnet (e.g., having the same polarity as the second quadrupole magnet); a recombining septum 161*b* of the second set can be arranged between the sixth quadrupole magnet and a seventh quadrupole magnet (e.g., having the same polarity as the first quadrupole magnet); another recombining septum 161*a* of the first set can be arranged between the seventh quadrupole magnet and an eighth quadrupole magnet (e.g., having the same polarity as the second quadrupole magnet); another recombining septum 161*b* of the second set can be arranged between the eighth quadrupole magnet and a ninth quadrupole magnet (e.g., having the same polarity as the first quadrupole magnet); the first recombining kicker 162*a* can be arranged between the ninth quadrupole magnet and a tenth quadrupole magnet (e.g., having the same polarity as the second quadrupole magnet); and/or the second recombining kicker 162*b* can be arranged after the tenth quadrupole magnet.

In a third specific example of this first example, in which the splitter includes more than two kickers, some of the kickers define substantially identical deflection planes as each other, whereas others define substantially different deflection planes from each other.

However, the system can additionally or alternatively include any other suitable elements in any suitable arrangement.

3. Method

3.1 Normal Mode

Operating in a normal mode S410 preferably functions to generate light outputs according to the full system capabilities (e.g., wherein all light beams are available concurrently at full intensity, wherein all accelerator modules are used in the generation of the light outputs, etc.) and/or at any other suitable desired level of operation. S410 is preferably performed while all accelerator modules are operational (and/or under any other circumstances in which S410 is enabled by the system).

In the normal mode, the electron input preferably receives electron bunches from a plurality of accelerator modules (wherein the electron input may, in some embodiments, combine these bunches into a single combined electron beam). In this mode, the system (e.g., the splitter 120) preferably directs the received electron bunches onto a plurality of paths (e.g., one for each radiator module). In particular, the system preferably directs the received electron bunches such that each path of the plurality (e.g., each radiator module of the plurality) receives electron bunches from only a single accelerator module. For example, in S410, the splitter can receive electron bunches from two accelerator modules and direct these electron bunches onto four different paths (e.g., each directed to a different radiator module); in this example, two of the paths receive electron bunches only from the first accelerator module, and the other two paths receive electron bunches only from the second accelerator module.

Analogously, in the normal mode, the recombiner preferably recombines the separated electron beams into a lesser number of beams, more preferably the same number as received from the electron input at the splitter, and provides these beam(s) to the electron output (wherein the electron output may, in some embodiments, such as embodiments in which the electron output receives a combined electron beam that includes electron bunches originating from multiple accelerator modules, separate the beam(s) into a greater number of beams, such as a separate beam for each accelerator module). The recombiner and electron output preferably function to reverse (or substantially reverse) whatever beam manipulations are performed by the splitter and electron input in the normal mode, but can additionally or alternatively have any other suitable functions.

However, operating in the normal mode S410 can additionally or alternatively include any other suitable elements performed in any suitable manner.

3.2 Backup Mode

Operating in a backup mode S420 preferably functions to maintain light output generation (preferably of all light beams, but alternatively of only a subset thereof), even without the use of all accelerator module electron beams. S420 is preferably performed when one or more accelerator modules is unavailable (e.g., in a failure state, exhibiting poor electron beam characteristics, under maintenance, etc.). However, S420 can additionally or alternatively be performed with any other suitable timing.

In the backup mode, the electron input may receive electron bunches from only a single accelerator module. Additionally or alternatively, in embodiments including more than two accelerator modules, the electron input may receive electron bunches from more than one (but not all) of these accelerator modules (e.g., all but one accelerator modules). In this mode, the system (e.g., the splitter 120) preferably directs the received electron bunches onto the same plurality of paths as in the normal mode, and preferably does so such that each path of the plurality receives electron bunches from only a single accelerator module (although, for any given path, it may receive electron bunches from a different accelerator module than in the normal mode, such as due to unavailability of the accelerator module used in the normal mode). For example, in S420, the splitter can receive electron bunches from a single accelerator module (e.g., at twice the rate at which electron bunches are received from a single accelerator module in S410, such that the overall rate at which electron bunches are received is unchanged or substantially unchanged between S410 and S420), and can direct these electron bunches onto four different paths (e.g., each directed to a different radiator module).

Analogously, in the backup mode, the recombiner preferably recombines the separated electron beams into a lesser number of beams, more preferably the same number as received from the electron input at the splitter, and provides these beam(s) to the electron output. Typically, in the backup mode, the recombiner will provide only a single electron beam, including only electron bunches originating from a single accelerator module, to the electron output, and the electron output will not split this single electron beam into multiple beams; however, in some alternate embodiments, such as embodiments in which the electron output receives a combined electron beam that includes electron bunches originating from multiple accelerator modules, the electron output may separate the beam(s) into a greater number of beams, such as a separate beam for each accelerator module (e.g., in a manner analogous to its operation in the normal mode). The recombiner and electron output preferably function to reverse (or substantially reverse) whatever beam manipulations are performed by the splitter and electron input in the backup mode, but can additionally or alternatively have any other suitable functions.

In some examples, operating in the backup mode may include activating (and/or changing operation mode of) one or more deflectors (e.g., of the splitter and/or recombiner), such as to deflect an electron beam onto a midline (e.g., as described above in more detail regarding the splitter and/or recombiner).

In some embodiments, the method can include operating in more than one variation of the backup mode. For example, a first variation of the backup mode can be configured to accommodate failure of a first accelerator module (e.g., while a second accelerator module continues to operate in a nominal condition), whereas a second variation of the backup mode can be configured to accommodate (e.g., in a manner analogous to the first variation) failure of the second accelerator module (e.g., while the first accelerator module continues to operate in the nominal condition).

However, operating in the backup mode S420 can additionally or alternatively include any other suitable elements performed in any suitable manner.

3.3 Kicker Aliasing

In some embodiments, for one or more of the kickers of the system, the "effective" or aliased kicker frequency sampled by the electron bunches may differ from the true kicker frequency (e.g., the true frequency at which the electromagnetic field within the kicker varies). The electron bunches traversing each kicker are the mechanism by which the electron beam(s) sample the electromagnetic field within that kicker. Accordingly, for a substantially evenly-spaced train of electron bunches defining an electron beam frequency $f_e$, the maximum kicker frequency that can accurately be sampled by these electron bunches is the Nyquist limit $f_e/2$; for kicker frequencies greater than this limit, aliasing will occur. In particular, for a kicker operating at a kicker frequency $f_k$, the effective frequency $f_p$ sampled by the electron beam having frequency $f_e$ is given by the relationship $$f_p = \left| f_k - f_e * NINT\left(\frac{f_k}{f_e}\right) \right|,$$

wherein NINT is the nearest integer function (rounding up for half-integer values, such as rounding 10.5 up to 11, but rounding 10.4 down to 10); for a kicker frequency greater than the Nyquist limit for an electron beam, the resulting effective frequency for that electron beam will be no greater than the Nyquist limit (that is, $f_p \leq f_e/2$).

In some such embodiments, it may be beneficial for one or more of the kickers to operate at frequencies greater than the Nyquist limit corresponding to the electron bunches traversing the kicker. For example, lower kicker frequencies typically require larger kicker cavities, which may increase complexity and/or expense of the kicker. Accordingly, it may be beneficial to instead employ a smaller kicker cavity (thereby reducing complexity and/or expense) to generate a higher kicker frequency that aliases to the desired lower frequency. For example, given a sampling frequency $f_e$ and a desired effective frequency $f_p$, the kicker frequency $f_k$ may be selected from the set of values $mf_e + nf_p$, where m and n are integers (recognizing that not all such values $mf_e + nf_p$ may result in the desired effective frequency $f_p$, as some may instead alias to a different frequency, such as a harmonic of $f_p$).

In a first example, in which the desired effective frequency (e.g., for deflecting electron bunches from a single beam in two different directions, for recombining electron bunches arriving from two different directions into a single beam, etc.) is equal to one half of the incoming electron beam ($f_p = f_e/2$), a kicker can be configured to produce a kicker frequency $f_k = f_e(1 + n/2)$, where n is a non-negative integer (e.g., wherein n=1, such that $f_k = 3f_e/2$; wherein n=2, such that $f_k = 2f_e$; etc.). In a second example, in which the desired effective frequency (e.g., for deflecting electron bunches from a single beam in four different directions, for recombining electron bunches arriving from four different directions into a single beam, etc.) is equal to one quarter of the incoming electron beam ($f_p = f_e/4$), a kicker can be configured to produce a kicker frequency $f_k = f_e(3/4 + n/2)$, where n is a non-negative integer (e.g., wherein n=1, such that $f_k = 3f_e/4$; wherein n=2, such that $f_k = 5f_e/4$; etc.). In a third example, in which the desired effective frequency (e.g., for deflecting electron bunches from a single beam in five different directions, for recombining electron bunches arriving from five different directions into a single beam, etc.) is equal to one fifth of the incoming electron beam ($f_p = f_e/5$), a kicker can be configured to produce a kicker frequency $f_k = f_e(4/5 + n + m)$, where n is a non-negative integer and m is either zero or 2/5 (e.g., wherein n=0 and m=2/5, such that $f_k = 6f_e/5$; wherein n=1 and m=0, such that $f_k = 9f_e/5$; wherein n=1 and m=2/5, such that $f_k = 11f_e/5$; etc.).

3.4 Exemplary Embodiments

Herein some exemplary embodiments of the method 400 are described. These embodiments are described in the context of performing the method 400 using a redundant light source system in which electron bunches from two accelerator modules (e.g., each operating at or substantially at an accelerator frequency $f_o$) are split onto four distinct paths. However, a person of skill in the art will recognize that the embodiments described herein (and/or any suitable elements thereof) can analogously be applied in the context of a system including any other suitable number of accelerator modules, electron beam paths, and/or radiator modules.

Figure 5A:
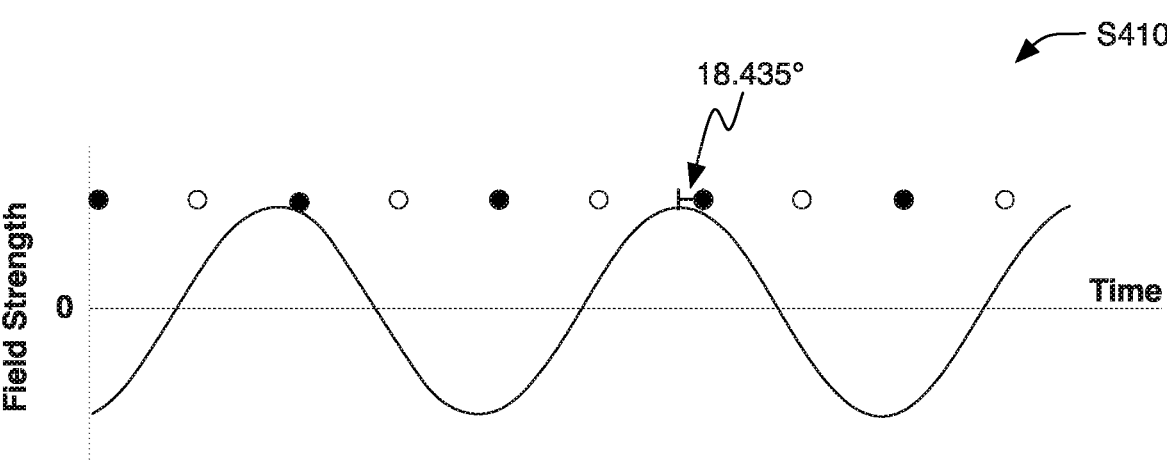
FIGS. 5A-5B are schematic representations of timing associated with a first example of operating in a normal mode and a backup mode, respectively.

In a first embodiment, a single electron beam (e.g., combined electron beam) is received at the electron input. In this embodiment, while operating in the normal mode S410, the received beam preferably includes alternating electron bunches from the two accelerator modules, wherein each accelerator module skips every other electron bunch (e.g., wherein each accelerator module defines a pulse repetition frequency equal to $f_o/2$, wherein the pulses between the two accelerator modules are completely, or substantially completely, out of phase with each other, such that the time between each electron bunch in the combined beam is substantially constant), such as shown by way of examples in FIGS. 5A and/or 5C. However, the electron bunches from each accelerator module can alternatively have any other suitable timing (e.g., wherein the first accelerator module provides multiple pulses in a row, such as two in a row, then provides no pulses while the second accelerator module provides multiple pulses in a row, such as two, and so on, preferably such that the combined pulse train generated by the two accelerator modules has equal spacing between the pulses even though the pulses from each individual accelerator module are not equally spaced). In some examples of this embodiment, each kicker of the splitter preferably operates at a frequency such that four electron bunches are incident on the kicker during each kicker period (e.g., the kicker frequency is equal, or substantially equal, to $f_o/4$).

In a first example of this embodiment, a single kicker separates the incoming electron beam into four beams (e.g., as shown by way of examples in FIGS. 2A and/or 2B). In some specific examples, the phase offset between the kicker period and electron bunch incidence is equal (or substantially equal) to 18.435° of the kicker waveform (wherein arrival of the first of four electron bunches is retarded by 18.435° following the maximum of the kicker period), thereby resulting in substantially equiangular spacing between the four resulting electron beams.

In a second example of this embodiment, a first kicker separates a portion of the incoming electron beam into two additional beams, preferably while leaving a remainder of the incoming electron beam unperturbed (or substantially unperturbed), and a second kicker separates the remainder (or any suitable subset thereof) of the incoming electron beam into two more beams (e.g., as shown by way of examples in FIGS. 2C, 2D, and/or 2E-2H). In this example, the first kicker is preferably timed such that maximum field intensity occurs for every second electron bunch (whereas the alternate electron bunches experience zero or substantially zero field intensity within the first kicker). Further, in this example, the second kicker is preferably timed π/2 radians (with respect to the kicker frequency, and neglecting the timing offset required for electron propagation from the first kicker to the second kicker) out of phase with the first kicker, such that the electron bunches that experience zero field intensity in the first kicker will experience maximum (or substantially maximum) field intensity in the second kicker, and vice versa. For example, in S410, two accelerator modules can provide electron bunches in alternating order, wherein the first kicker deflects only electron bunches from the first accelerator module, while the second kicker deflects only electron bunches from the second accelerator module (e.g., as shown in FIG. 5C). In a variant of this example, the splitter can include more than two kickers, wherein each additional kicker performs an analogous role to those described above (e.g., wherein all but the last kicker of the splitter deflect only a subset of electron bunches that traverse them, while the last kicker of the splitter preferably deflects the remaining electron bunches; and/or wherein each kicker of the recombiner redirects the incoming electron beam(s) that it receives onto a common trajectory, such that the set of all such kickers cooperatively function to recombine the plurality of beams into a single beam propagating along that common trajectory).

However, the kicker(s) of the splitter can additionally or alternatively operate with any other suitable timing. In S410, the recombiner preferably operates in a manner analogous to the splitter (e.g., with analogous kicker timing), recombining the four separated electron beams into a single combined beam (e.g., directed substantially along a midline that bisects the four separated electron beams incoming at the recombiner, directed substantially collinear with the combined electron beam received at the splitter, etc.). This combined electron beam may subsequently be separated into two electron beams (e.g., at the electron output), wherein each of these two electron beams preferably includes only electron bunches originating from a single accelerator module and is preferably provided to that accelerator module from the electron output. In the first example described above, the recombiner preferably includes a single kicker with timing analogous to that described regarding the kicker of the splitter (e.g., with a phase offset between the kicker period and electron bunch incidence equal (or substantially equal) to 18.435° of the kicker waveform). In the second example described above, the recombiner preferably includes two kickers with timing analogous to that described regarding the kickers of the splitter (e.g., $\pi/2$ radians out of phase with each other, and with peaks and zeros aligned with electron bunch arrival timing); accordingly, in S410, the path lengths for all electron bunches originating from any one accelerator module can be kept equal (wherein all bunches redirected by the first kicker will experience the same path length as each other; wherein all bunches redirected by the second kicker will experience the same path length as each other, although this path length may differ from that experienced by bunches redirected by the first kicker; etc.). In some specific examples of the second example, the spatial separation between these two kickers is preferably equal (or substantially equal) to that between the kickers of the splitter. More preferably, in some such specific examples, the electron beams that are separated by the first kicker of the splitter are then recombined by the first kicker of the recombiner, and/or the electron beams that are separated by the second kicker of the splitter are then recombined by the second kicker of the recombiner, wherein the second kicker of the splitter is downstream of the first kicker of the splitter, and the second kicker of the recombiner is downstream of the first kicker of the recombiner (e.g., as shown in FIGS. 2E-2H).

Figure 5B:
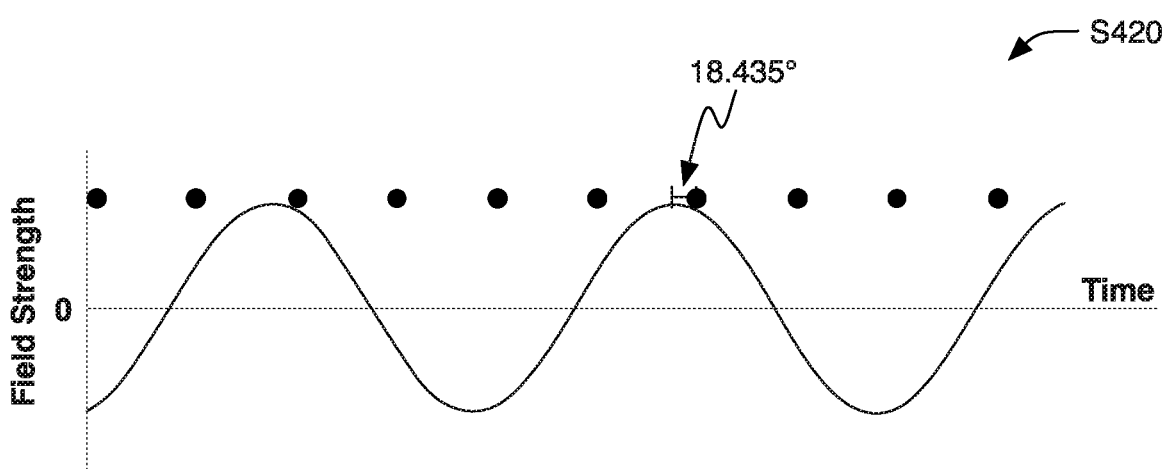
Figures 5C, 5D:
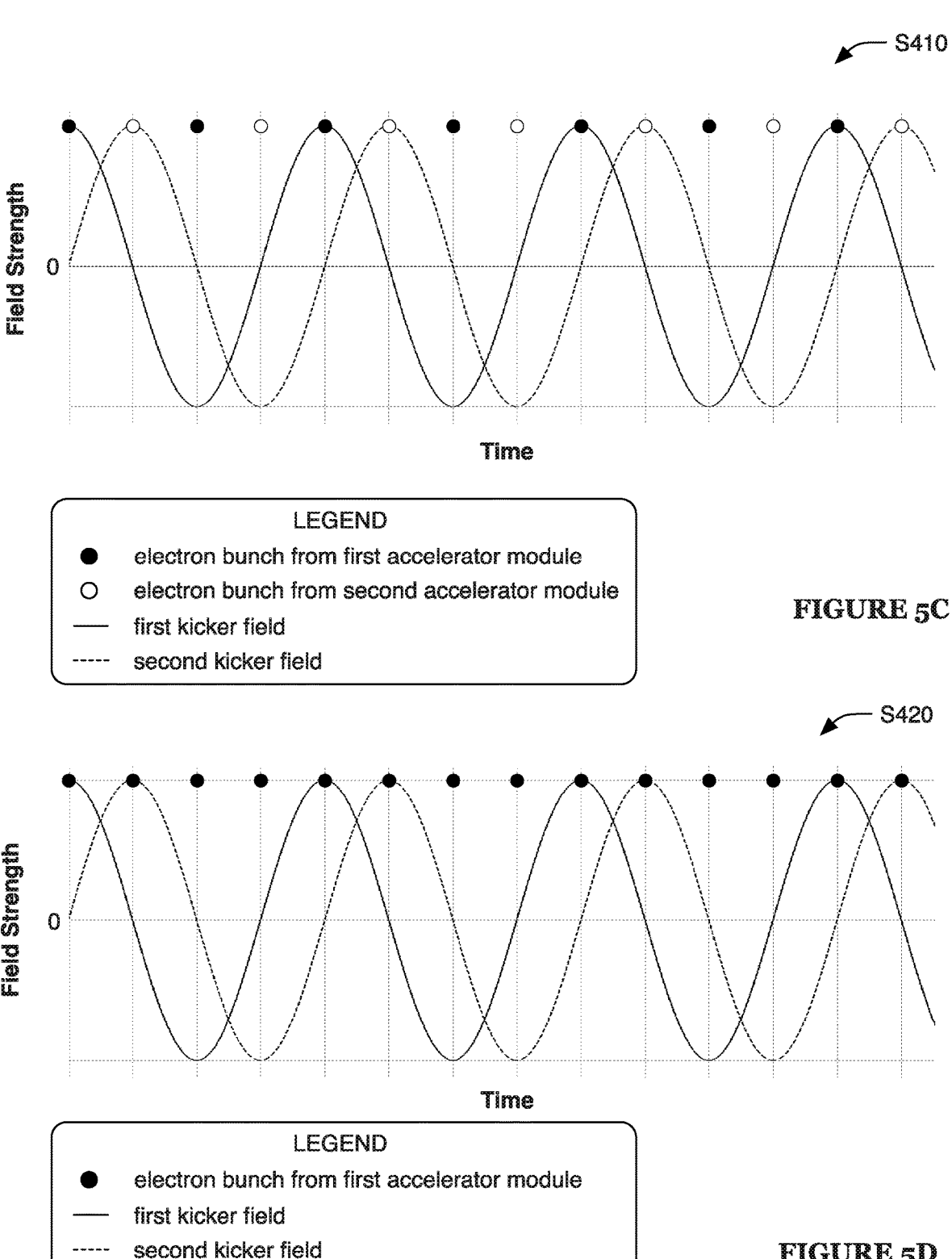
FIGS. 5C-5D are schematic representations of timing associated with a second example of operating in a normal mode and a backup mode, respectively.

In this first embodiment, while operating in the backup mode S420, the electron beam received at the electron input typically includes electron bunches only from one accelerator module (e.g., due to unavailability of the other accelerator module, such as shown by way of examples in FIGS. 5B and/or 5D. In this embodiment, S420 preferably includes receiving electron bunches from the remaining operational accelerator module at twice the rate they are received in S410 (e.g., wherein the operational accelerator module doubles its pulse repetition frequency such as to be equal to $f_o$). Accordingly, the timing of electron bunches received at the electron input remains identical, or substantially identical, to the timing in S410, although all electron bunches originate from a single accelerator module. In this embodiment, all other aspects of operating the splitter preferably remain unchanged (or substantially unchanged). In S420, the recombiner preferably operates in a manner analogous to the splitter (e.g., with analogous kicker timing), preferably functioning to recombine the four separated electron beams into a single combined beam (e.g., directed substantially along a midline that bisects the four separated electron beams incoming at the recombiner, directed substantially collinear with the combined electron beam received at the splitter, etc.), which is preferably provided to the functioning accelerator module from the electron output.

Figure 6:
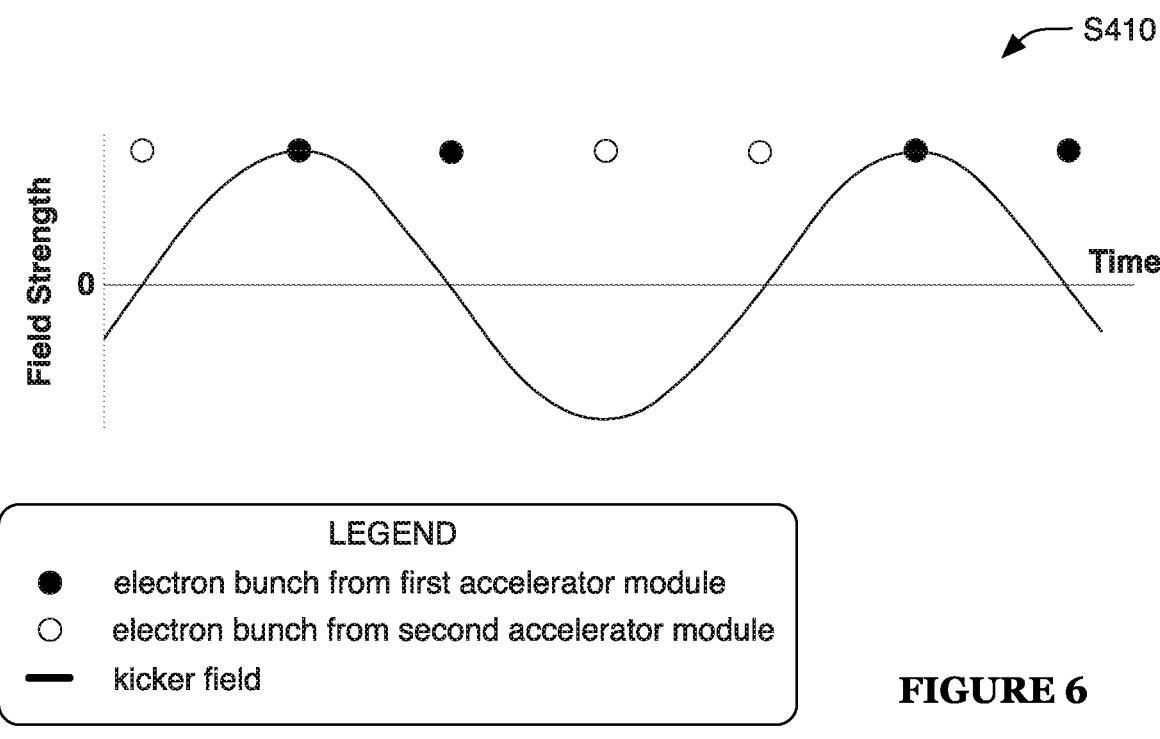
FIG. 6 is a schematic representation of timing associated with a second example of operating in the normal mode.

In a second embodiment, two separate electron beams (e.g., convergent electron beams) are received at the electron input, wherein these two beams define a separation angle α between them. In this embodiment, when operating in the normal mode S410, each of the two incoming electron beams preferably defines a two-on, two-off pattern of electron bunches (e.g., wherein each beam defines a pulse repetition frequency of $f_o/2$, with gating at $f_o/4$); preferably, the timing of the two electron beams is offset by half of the gating frequency so that, when the bunches of the two beams are considered in combination, their timing exhibits equal (or substantially equal) spacing (e.g., with a first bunch in the first beam, followed by a second bunch in the first beam, followed by a third bunch in the second beam, followed by a fourth bunch in the second beam, and then repeating this same pattern, wherein the temporal spacing between each of these bunches is equal to $1/f_o$), such as shown by way of example in FIG. 6. In this embodiment, in S410, the kicker of the splitter preferably operates at a frequency such that four electron bunches (two from each beam) are incident on the kicker during a single period (e.g., wherein the kicker frequency is equal or substantially equal to $f_o/4$). In this embodiment, there is preferably no (or substantially no) phase offset between the kicker period (e.g., the kicker field maximum) and the incidence time of the first electron bunch of the kicker period. Accordingly, one bunch of each electron beam is deflected by the maximum amount (e.g., farther from the midline between the two incoming beams), while the other bunch from that beam is substantially not deflected. Herein that maximum deflection is preferably equal (or substantially equal) to the separation angle α between the incoming beams. In S410, the recombiner preferably operates in a manner analogous to the splitter (e.g., with analogous kicker timing), functioning to recombine each pair of electron beams into two electron beams (e.g., divergent electron beams, preferably defining a separation angle α between them), wherein each of these two electron beams preferably includes only electron bunches originating from a single accelerator module.

In this second embodiment, when operating in the backup mode S420, operation of the system (e.g., the electron input, splitter, recombiner, electron output, and/or functional accelerator module thereof) is preferably analogous to that described above regarding operating in the backup mode of the first embodiment. Accordingly, when one accelerator module is unavailable, the remaining accelerator module will preferably provide twice as many electron bunches (e.g., making up for the missing bunches from the unavailable accelerator module), such as operating at a pulse repetition frequency of $f_o$, and a phase offset (e.g., equal, or substantially equal, to 18.435° of the kicker waveform) is preferably introduced (e.g., matching the offset described above regarding the first embodiment), such as described above regarding the first embodiment (e.g., as shown in FIG. 5B). Further, in this embodiment, S420 preferably includes deflecting the remaining electron beam (e.g., by activating a deflector of the splitter, such as a dipole magnet and/or any other suitable deflector), more preferably to direct that electron beam into the kicker along a path analogous to that described above regarding the first embodiment, such as a path directed substantially along a midline (e.g., midline that bisects the two incoming electron beam paths defined while operating in the normal mode), such as shown by way of example in FIG. 3C. In S420, the recombiner preferably operates in a manner analogous to the splitter (e.g., with analogous kicker timing), functioning to recombine the four separated electron beams into a single combined beam; further, a deflector of the recombiner is preferably employed to redirect the combined beam (e.g., off of a midline trajectory) onto a trajectory matching that seen when operating the normal mode (e.g., at an angle $\alpha/2$ from the midline), which is preferably provided to the functioning accelerator module from the electron output.

However, the method 400 can additionally or alternatively include any other suitable elements and/or be performed in any other suitable manner.

4. Specific Examples

A numbered list of specific examples of the technology described herein are provided below. A person of skill in the art will recognize that the scope of the technology is not limited to and/or by these specific examples.

1. A light source system comprising:
   a first kicker configured to:
      receive an input electron beam comprising a plurality of electron bunches; and
      deflect electron bunches of the electron beam substantially within a first plane, thereby spatially separating the input electron beam into a first plurality of electron beams;
   a second kicker configured to:
      receive the first plurality of electron beams; and
      deflect electron bunches of the first plurality of electron beams substantially within a second plane, thereby spatially separating the first plurality of electron beams into a second plurality of electron beams;
   a first septum configured to:
      receive a first subset of the second plurality of electron beams; and
      deflect electron beams of the first subset substantially within the first plane; and
   a second septum configured to:
      receive a second subset of the second plurality of electron beams; and
      deflect electron beams of the second subset substantially within the second plane.
2. The system of Specific Example 1, further comprising an array of quadrupole magnets arranged substantially along the array axis and defining a focusing-defocusing (FODO) lattice, the FODO lattice defining a period length, the array axis defined along an intersection of the first plane and the second plane, the array comprising:

a first magnet arranged between the first kicker and the second kicker, the first magnet configured to focus the first plurality of electron beams substantially within the first plane;
   a second magnet arranged between the second kicker and the first septum, the second magnet arranged substantially half a period length along the array axis from the first magnet, the second magnet configured to focus the second plurality of electron beams substantially within the second plane; and
   a third magnet arranged between the first septum and the second septum, the third magnet arranged substantially half of a period length along the array axis from the second magnet and substantially one period length along the array axis from the first magnet, the third magnet configured to focus the electron beams of the second subset substantially within the first plane.
3. The system of Specific Example 2, wherein the third magnet is further configured to focus the electron beams of the first subset substantially within the first plane, the system further comprising:
   a third septum configured to:
      receive the first subset of the second plurality of electron beams from the third magnet; and
      deflect electron beams of the first subset substantially within the first plane; and
   a fourth septum configured to:
      receive the second subset of the second plurality of electron beams; and
      deflect electron beams of the second subset substantially within the second plane;
   wherein the third septum is arranged between the second septum and the fourth septum.
4. The system of Specific Example 3, further comprising a fourth magnet arranged between the second septum and the third septum, wherein:
   the fourth magnet is arranged substantially half of a period length along the array axis from the third magnet and substantially one period length along the array axis from the second magnet;
   the fourth magnet is configured to focus the second plurality of electron beams substantially within the second plane; and
   the third septum is configured to receive the first subset of the second plurality of electron beams from the third magnet via the fourth magnet.
5. The system of Specific Example 4, further comprising a fifth magnet arranged between the third septum and the fourth septum, wherein:
   the fifth magnet is arranged substantially half of a period length along the array axis from the fourth magnet and substantially one period length along the array axis from the third magnet;
   the fifth magnet is configured to focus the second subset of the second plurality of electron beams substantially within the first plane; and
   the fourth septum is configured to receive the second subset of the second plurality of electron beams from the fifth magnet.
6. The system of any of the preceding Specific Examples, wherein the first plane is substantially orthogonal to the second plane.
7. The system of any one of Specific Examples 1-5, wherein the first plane is substantially parallel to the second plane.

8. The system of any one of Specific Examples 1-5, wherein the first plane is substantially coplanar with the second plane.

9. The system of any one of Specific Examples 1-6, wherein the second plurality of electron beams comprises a first, second, third, and fourth electron beam.

10. The system of Specific Example 9, wherein:
the first subset comprises the first and second electron beams; and
the second subset comprises the third and fourth electron beams.

11. The system of Specific Example 9 or 10, further comprising:
a first radiator module comprising a first undulator, the first radiator module configured to receive the first electron beam and, at the first undulator, generate a first light output via free-electron lasing;
a second radiator module comprising a second undulator, the second radiator module configured to receive the second electron beam and, at the second undulator, generate a second light output via free-electron lasing;
a third radiator module comprising a third undulator, the third radiator module configured to receive the third electron beam and, at the third undulator, generate a third light output via free-electron lasing; and
a fourth radiator module comprising a fourth undulator, the fourth radiator module configured to receive the fourth electron beam and, at the fourth undulator, generate a fourth light output via free-electron lasing.

12. The system of Specific Example 11, further comprising:
a third kicker configured to:
receive the first electron beam and the second electron beam; and
deflect at least one beam substantially within a third plane, thereby recombining the first and second electron beams into a first recombined beam, wherein the at least one beam is selected from the group consisting of: the first electron beam and the second electron beam; and
a fourth kicker configured to:
receive the third electron beam, the fourth electron beam, and the first recombined beam; and
deflect at least two beams substantially within a fourth plane, thereby recombining the third electron beam, the fourth electron beam, and the first recombined beam into a second recombined beam, wherein the at least two beams are selected from the group consisting of: the third electron beam, the fourth electron beam, and the first recombined beam.

13. The system of Specific Example 12, wherein the first plane is parallel to the third plane.

14. The system of Specific Example 12 or 13, further comprising an accelerator module comprising an energy recovery loop (ERL), the accelerator module configured to:
provide a first subset of the plurality of electron bunches to the first kicker; and
at the ERL, receive the first subset of the plurality of electron bunches after the first subset of the plurality of electron bunches traverse the fourth kicker.

15. The system of Specific Example 14, further comprising a second accelerator module comprising a second ERL, the second accelerator module configured to:
provide a second subset of the plurality of electron bunches to the first kicker; and

at the second ERL, receive the second subset of the plurality of electron bunches after the second subset of the plurality of electron bunches traverse the fourth kicker.

16. The system of any of the preceding Specific Examples, wherein the first radiator module further comprises:
a fifth kicker configured to receive the first electron beam and split the first electron beam into a third plurality of spatially-separated electron beams;
a plurality of undulators, the plurality comprising the first undulator, wherein, for each electron beam of the third plurality: the plurality of undulators comprises a respective undulator configured to receive the respective electron beam and generate a respective light output via free-electron lasing; and
a sixth kicker configured to receive the third plurality of electron beams and recombine the third plurality of electron beams into a third recombined beam.

17. The system of any of the preceding Specific Examples, further comprising a plurality of radiator modules, each radiator module of the plurality comprising a respective undulator, wherein, for each electron beam of the second plurality: a respective radiator module of the plurality is configured to receive the respective electron beam and, at the respective undulator, generate a respective light output via free-electron lasing.

18. The system of Specific Example 17, wherein, for each radiator module of the plurality, the respective radiator module comprises:
a respective splitting kicker configured to receive a respective electron beam and split it into a respective plurality of spatially-separated electron beams;
for each electron beam of the respective plurality: a respective undulator configured to receive the respective electron beam and generate a respective light output via free-electron lasing; and
a respective recombining kicker configured to receive the respective plurality of spatially-separated electron beams and recombine them into a respective recombined electron beam.

19. The system of any of the preceding Specific Examples, wherein:
the first kicker deflects a first subset of electron bunches in a first direction, deflects a second subset of electron bunches in a second direction opposing the first direction, and does not substantially deflect a third subset of electron bunches;
the first subset of electron bunches define a first redirected beam;
the second subset of electron bunches define a second redirected beam;
the third subset of electron bunches define a remainder beam;
the second kicker deflects a fourth subset of electron bunches of the remainder beam in a third direction and deflects a fifth subset of electron bunches of the remainder beam in a fourth direction opposing the third direction;
the fourth subset of electron bunches define a third redirected beam; and
the fifth subset of electron bunches define a fourth redirected beam.

20. The system of Specific Example 19, wherein:
the first subset of electron bunches consists of about 25% of the electron bunches of the plurality;

the second subset of electron bunches consists of about 25% of the electron bunches of the plurality;

the third subset of electron bunches consists of about 50% of the electron bunches of the plurality;

the fourth subset of electron bunches consists of about 25% of the electron bunches of the plurality; and the fifth subset of electron bunches consists of about 25% of the electron bunches of the plurality.

21. A light source system comprising:

a first kicker configured to:

receive a set of electron bunches defining a first and second input beam; and deflect electron bunches of the set such that the set of electron bunches is separated into: a first portion that propagates in a first direction, a second portion that propagates in a second direction different from the first direction, and a third portion that propagates in a third direction different from the first direction and different from the second direction;

a second kicker configured to:

receive the third portion, wherein the third portion comprises a first subportion and a second subportion; and deflect at least one of the first subportion or the second subportion, such that:

the first subportion propagates in a fourth direction; and the second subportion propagates in a fifth direction different from the fourth direction;

a first accelerator module configured to provide the first input beam to the first kicker; and a second accelerator module configured to provide the second input beam to the first kicker.

22. The system of Specific Example 21, wherein the first and second input beam are substantially collinear.

23. The system of Specific Example 21 or 22, further comprising:

a first radiator module configured to receive the first portion and generate a first optical output via free-electron lasing;

a second radiator module configured to receive the second portion and generate a second optical output via free-electron lasing;

a third radiator module configured to receive the first subportion and generate a third optical output via free-electron lasing; and a fourth radiator module configured to receive the second subportion and generate a fourth optical output via free-electron lasing.

24. The system of Specific Example 23, further comprising:

a third kicker configured to:

receive the first portion from the first radiator module;

receive the second portion from the second radiator module; and recombine the first and second portions into a first recombined beam; and a fourth kicker configured to:

receive the first subportion from the third radiator module;

receive the second subportion from the fourth radiator module; and recombine the first and second subportions into a second recombined beam collinear with the first recombined beam.

25. The system of any one of Specific Examples 21-24, wherein:

the first input beam comprises a first subset of electron bunches;

the second input beam comprises a second subset of electron bunches;

the system further comprises a fifth kicker configured to:

receive the first and second recombined beams; and deflect at least one of the first subset or the second subset, such that:

the first subset defines a first output beam; and the second subset defines a second output beam spatially separated from the first output beam;

the first accelerator module comprises a first energy recovery linac (ERL) configured to receive the first output beam; and the second accelerator module comprises a second ERL configured to receive the second output beam.

26. The system of Specific Example 25, wherein the third portion consists essentially of the second subset of electron bunches.

27. The system of any one of Specific Examples 23-26, wherein the first radiator module comprises:

a third kicker configured to receive the first portion and split the first portion into a plurality of spatially-separated electron beams;

a plurality of undulators, wherein, for each electron beam of the plurality of spatially-separated electron beams: the plurality of undulators comprises a respective undulator configured to receive the respective electron beam and generate a respective light output via free-electron lasing; and a fourth kicker configured to receive the plurality of spatially-separated electron beams and recombine the plurality of spatially-separated electron beams into a recombined beam.

28. The system of any one of Specific Examples 21-27, wherein:

the first kicker is configured to deflect electron bunches of the set substantially within a first plane; and the second kicker is configured to deflect at least one of the first subportion or the second subportion substantially within the first plane.

29. The system of any one of Specific Examples 21-27, wherein:

the first kicker is configured to deflect electron bunches of the set substantially within a first plane; and the second kicker is configured to deflect at least one of the first subportion or the second subportion substantially within a second plane substantially orthogonal to the first plane.

30. The system of any one of Specific Examples 21-29, wherein the first kicker is configured to deflect the first and second portions and substantially not deflect the third portion.

31. A method for light source operation, the method comprising:

at a separating kicker:

receiving an input electron beam comprising a plurality of electron bunches defining an input electron beam frequency $f_e$; and imposing a first substantially periodic electromagnetic field defining a separating kicker frequency $f_s$, wherein $f_s > f_o/2$, such that the input electron beam samples a first aliased kicker frequency $f_p$, wherein $f_p \leq f_o/2$, thereby spatially separating the input electron beam into a plurality of electron beams;

after spatially separating the input electron beam into the plurality of electron beams:

using a first electron beam of the plurality, generating a first optical output via free-electron lasing; and using a second electron beam of the plurality, generating a second optical output via free-electron lasing; and after generating the first and second optical outputs, at a recombining kicker:

receiving the plurality of electron bunches; and imposing a second substantially periodic electromagnetic field defining a recombining kicker frequency $f_r$, wherein $f_r > f_o/2$, such that a second aliased kicker frequency defined by the recombining kicker frequency and the input electron beam frequency is equal to the first aliased kicker frequency $f_p$, thereby recombining the plurality of electron bunches into an output electron beam.

32. The method of Specific Example 31, wherein generating the first optical output comprises:

at a second separating kicker:

receiving a first electron beam of the plurality, wherein the first electron beam defines a first electron beam frequency $f_e' < f_o$;

imposing a third substantially periodic electromagnetic field defining a second separating kicker frequency $f_s'$, wherein $f_s' > f_e'/2$, such that the first electron beam samples a third aliased kicker frequency $f_p'$, wherein $f_p \leq f_e'/2$, thereby spatially separating the first electron beam into a second plurality of electron beams, the second plurality comprising a third electron beam; and at a first undulator:

receiving the third electron beam; and generating the first optical output via free-electron lasing of the third electron beam.

33. The method of Specific Example 32, further comprising, after generating the first optical output, at a second recombining kicker:

receiving the second plurality of electron beams; and imposing a fourth substantially periodic electromagnetic field defining a second recombining kicker frequency $f_r'$, wherein $f_r' > f_e'/2$, such that a fourth aliased kicker frequency defined by the second recombining kicker frequency and the first electron beam frequency is equal to the third aliased kicker frequency $f_p'$, thereby recombining the second plurality of electron beams into a first recombined electron beam;

wherein the recombining kicker receives the plurality of electron bunches after the second recombining kicker recombines the second plurality of electron beams into the first recombined electron beam.

34. The method of Specific Example 33, wherein the second recombining kicker frequency is equal to the second separating kicker frequency.

35. The method of Specific Example 33 or 34, wherein the second plurality of electron beams comprises five spatially-separated electron beams, wherein $f_p' = f_e'/5$.

36. The method of any one of Specific Examples 33-35, wherein $f_s' = f_e' - k f_p'$, where k is a positive integer.

37. The method of any one of Specific Examples 32-36, further comprising, at the first undulator:

substantially concurrent with receiving the third electron beam, receiving a fourth electron beam of the second plurality; and substantially concurrent with generating the first optical output via free-electron lasing of the third electron beam, generating a third optical output via free-electron lasing of the fourth electron beam.

38. The method of any one of Specific Examples 31-37, wherein the recombining kicker frequency is equal to the separating kicker frequency.

39. The method of any one of Specific Examples 31-38, wherein the plurality of electron beams comprises four spatially-separated electron beams, wherein $f_p = f_o/4$.

40. The method of any one of Specific Examples 31-39, wherein $f_s = f_o - f_p$.

41. The method of any one of Specific Examples 31-40, wherein the method is performed using the light source system of any one of Specific Examples 1-30.

42. A method for light source system operation, comprising operating the light source system of any one of Specific Examples 1-30.

43. The system of any one of Specific Examples 1-30, wherein the system is configured to perform the method of any one of Specific Examples 31-40.

We claim:

1. A light source system comprising:

a first kicker configured to:

receive an input electron beam comprising a plurality of electron bunches; and deflect electron bunches of the electron beam substantially within a first plane, thereby spatially separating the input electron beam into a first plurality of electron beams;

a second kicker configured to:

receive the first plurality of electron beams; and deflect electron bunches of the first plurality of electron beams substantially within a second plane, thereby spatially separating the first plurality of electron beams into a second plurality of electron beams; and a septum configured to:

receive a subset of the second plurality of electron beams; and deflect electron beams of the subset substantially within the second plane.

2. The system of claim 1, further comprising an array of quadrupole magnets arranged substantially along an array axis and defining a focusing-defocusing (FODO) lattice, the FODO lattice defining a period length, the array axis defined along an intersection of the first plane and the second plane, the array comprising:

a first magnet arranged between the first kicker and the second kicker, the first magnet configured to focus the first plurality of electron beams substantially within the first plane;

a second magnet arranged between the second kicker and the septum, the second magnet arranged substantially half a period length along the array axis from the first magnet, the second magnet configured to focus the second plurality of electron beams substantially within the second plane; and a third magnet arranged between the second magnet and the septum, the third magnet arranged substantially half of a period length along the array axis from the second magnet and substantially one period length along the array axis from the first magnet, the third magnet configured to focus the electron beams of the subset substantially within the first plane.

3. The system of claim 2, wherein the third magnet is further configured to receive a second subset of the second plurality of electron beams and to focus the electron beams of the second subset substantially within the first plane, the system further comprising a second septum configured to:

receive the subset of the second plurality of electron beams; and deflect electron beams of the subset substantially within the second plane.

4. The system of claim 3, further comprising a fourth magnet arranged along the array axis between the septum and the second septum, wherein:

the fourth magnet is arranged substantially half of a period length along the array axis from the third magnet and substantially one period length along the array axis from the second magnet; and the fourth magnet is configured to focus the second plurality of electron beams substantially within the second plane.

5. The system of claim 4, further comprising a fifth magnet arranged along the array axis between the fourth magnet and the second septum, wherein:

the fifth magnet is arranged substantially half of a period length along the array axis from the fourth magnet and substantially one period length along the array axis from the third magnet;

the fifth magnet is configured to focus the subset of the second plurality of electron beams substantially within the first plane; and the second septum is configured to receive the subset of the second plurality of electron beams from the fifth magnet.

6. The system of claim 5, wherein the first plane is substantially orthogonal to the second plane.

7. The system of claim 2, wherein the first plane is substantially orthogonal to the second plane.

8. The system of claim 1, wherein the first plane is substantially orthogonal to the second plane.

9. The system of claim 8, wherein:

the second plurality of electron beams comprises a first, second, third, and fourth electron beam; and the subset comprises the third and fourth electron beams.

10. The system of claim 1, wherein:

the second plurality of electron beams comprises a first, second, third, and fourth electron beam; and the subset comprises the third and fourth electron beams.

11. The system of claim 10, further comprising:

a first radiator module comprising a first undulator, the first radiator module configured to receive the first electron beam and, at the first undulator, generate a first light output via free-electron lasing;

a second radiator module comprising a second undulator, the second radiator module configured to receive the second electron beam and, at the second undulator, generate a second light output via free-electron lasing;

a third radiator module comprising a third undulator, the third radiator module configured to receive the third electron beam and, at the third undulator, generate a third light output via free-electron lasing; and a fourth radiator module comprising a fourth undulator, the fourth radiator module configured to receive the fourth electron beam and, at the fourth undulator, generate a fourth light output via free-electron lasing.

12. The system of claim 11, further comprising:

a third kicker configured to:

receive the first electron beam and the second electron beam; and deflect at least one beam substantially within a third plane, thereby recombining the first and second electron beams into a first recombined beam, wherein the at least one beam is selected from the group consisting of: the first electron beam and the second electron beam; and a fourth kicker configured to:

receive the third electron beam, the fourth electron beam, and the first recombined beam; and deflect at least two beams substantially within a fourth plane, thereby recombining the third electron beam, the fourth electron beam, and the first recombined beam into a second recombined beam, wherein the at least two beams are selected from the group consisting of: the third electron beam, the fourth electron beam, and the first recombined beam.

13. The system of claim 12, wherein the first plane is parallel to the third plane.

14. The system of claim 12, further comprising an accelerator module comprising an energy recovery loop (ERL), the accelerator module configured to:

provide a first subset of the plurality of electron bunches to the first kicker; and at the ERL, receive the first subset of the plurality of electron bunches after the first subset of the plurality of electron bunches traverse the fourth kicker.

15. The system of claim 14, further comprising a second accelerator module comprising a second ERL, the second accelerator module configured to:

provide a second subset of the plurality of electron bunches to the first kicker; and at the second ERL, receive the second subset of the plurality of electron bunches after the second subset of the plurality of electron bunches traverse the fourth kicker.

16. The system of claim 12, wherein the first radiator module further comprises:

a fifth kicker configured to receive the first electron beam and split the first electron beam into a third plurality of spatially-separated electron beams;

a plurality of undulators, the plurality comprising the first undulator, wherein, for each electron beam of the third plurality: the plurality of undulators comprises a respective undulator configured to receive the respective electron beam and generate a respective light output via free-electron lasing; and a sixth kicker configured to receive the third plurality of electron beams and recombine the third plurality of electron beams into a third recombined beam.

17. The system of claim 1, further comprising a plurality of radiator modules, each radiator module of the plurality comprising a respective undulator, wherein, for each electron beam of the second plurality: a respective radiator module of the plurality is configured to receive the respective electron beam and, at the respective undulator, generate a respective light output via free-electron lasing.

18. The system of claim 17, wherein, for each radiator module of the plurality, the respective radiator module comprises:

a respective splitting kicker configured to receive a respective electron beam and split it into a respective plurality of spatially-separated electron beams;

for each electron beam of the respective plurality: a respective undulator configured to receive the respective electron beam and generate a respective light output via free-electron lasing; and a respective recombining kicker configured to receive the respective plurality of spatially-separated electron beams and recombine them into a respective recombined electron beam.

19. The system of claim 1, wherein:

the first kicker deflects a first subset of electron bunches in a first direction, deflects a second subset of electron bunches in a second direction opposing the first direction, and does not substantially deflect a third subset of electron bunches;

the first subset of electron bunches define a first redirected beam;

the second subset of electron bunches define a second redirected beam;

the third subset of electron bunches define a remainder beam;

the second kicker deflects a fourth subset of electron bunches of the remainder beam in a third direction and deflects a fifth subset of electron bunches of the remainder beam in a fourth direction opposing the third direction;

the fourth subset of electron bunches define a third redirected beam; and the fifth subset of electron bunches define a fourth redirected beam.

20. The system of claim 19, wherein:

the first subset of electron bunches consists of about 25% of the electron bunches of the plurality;

the second subset of electron bunches consists of about 25% of the electron bunches of the plurality;

the third subset of electron bunches consists of about 50% of the electron bunches of the plurality;

the fourth subset of electron bunches consists of about 25% of the electron bunches of the plurality; and the fifth subset of electron bunches consists of about 25% of the electron bunches of the plurality.

\* \* \* \* \*